United States Patent
Kim et al.

(10) Patent No.: US 11,818,619 B2
(45) Date of Patent: *Nov. 14, 2023

(54) ELECTRONIC DEVICE FOR PROVIDING CALL CONTINUITY IN WEAK ELECTRIC FIELD ENVIRONMENT AND CONTROL METHOD

(71) Applicant: Samsung Electronics Co., Ltd., Suwon-si (KR)

(72) Inventors: Juho Kim, Suwon-si (KR); Chinkyu Kang, Suwon-si (KR); Kiyong Lee, Suwon-si (KR); Yongchul Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/734,663

(22) Filed: May 2, 2022

(65) Prior Publication Data

US 2022/0264408 A1 Aug. 18, 2022

Related U.S. Application Data

(63) Continuation of application No. 16/957,531, filed as application No. PCT/KR2018/016955 on Dec. 31, 2018, now Pat. No. 11,323,937.

(30) Foreign Application Priority Data

Jan. 16, 2018 (KR) .................. KR10-2018-0005701

(51) Int. Cl.
*H04W 4/00* (2018.01)
*H04W 36/14* (2009.01)
(Continued)

(52) U.S. Cl.
CPC .......... *H04W 36/14* (2013.01); *H04W 12/06* (2013.01); *H04W 12/088* (2021.01);
(Continued)

(58) Field of Classification Search
CPC ... H04W 36/14; H04W 12/06; H04W 12/088; H04W 12/72; H04W 36/30; H04W 12/45;
(Continued)

(56) References Cited

U.S. PATENT DOCUMENTS 7,187,923 B2 * 3/2007 Mousseau ......... H04W 36/0066
455/553.1
3,195,234 A1 6/2012 Chang et al.
(Continued)

FOREIGN PATENT DOCUMENTS

CN 107371157 A 11/2017
JP 2012-510765 A 5/2012
(Continued)

OTHER PUBLICATIONS

Korean Decision of Grant with English translation dated May 12, 2022; Koran Appln. No. 10-2018-0005701.
(Continued)

*Primary Examiner* — Amancio Gonzalez
(74) *Attorney, Agent, or Firm* — Jefferson IP Law, LLP

(57) ABSTRACT

Provided are an electronic device and a control method for providing call continuity in a weak electric field environment. The electronic device according to various embodiments of the present document comprises: a processor; a memory operatively connected to the processor; and a wireless communication circuit operatively connected to the processor and the memory, wherein the processor can control the wireless communication circuit such that the electronic device receives a wireless signal for executing a call with an external electronic device through a first network,
(Continued)

check the state of the wireless signal received through the wireless communication circuit, control, on at least a partial basis of a result of checking the checked state of the wireless signal, the wireless communication circuit such that an authentication request for performing the call is transmitted to a second network connected to the electronic device, and control, on at least a partial basis of a result of the authentication request, the wireless communication circuit such that the wireless signal, which is transmitted from the first network, for performing the call with the external electronic device is received through the second network.

10 Claims, 16 Drawing Sheets

(51) Int. Cl.
*H04W 12/72* (2021.01)
*H04W 12/088* (2021.01)
*H04W 12/06* (2021.01)
*H04W 36/30* (2009.01)
*H04L 65/1016* (2022.01)

(52) U.S. Cl.
CPC ........... *H04W 12/72* (2021.01); *H04W 36/30* (2013.01); *H04L 65/1016* (2013.01)

(58) Field of Classification Search
CPC . H04W 88/06; H04W 36/0022; H04W 12/04; H04W 36/0038; H04L 65/1016; H04L 63/0272
USPC .......................................................... 370/332
See application file for complete search history.

(56) References Cited

U.S. PATENT DOCUMENTS

| | | | | |
|---|---|---|---|---|
| 8,195,234 | B2 * | 6/2012 | Chang ................... | H04M 1/724 455/558 |
| 8,811,421 | B2 * | 8/2014 | Su ......................... | H04W 36/28 370/465 |
| 8,964,702 | B1 * | 2/2015 | Park ................... | H04W 36/0079 370/332 |
| 8,971,894 | B2 * | 3/2015 | Sane ..................... | H04W 36/30 455/437 |
| 9,113,436 | B2 * | 8/2015 | Rui ...................... | H04W 68/005 |
| 9,247,413 | B1 * | 1/2016 | Sahoo ................... | H04W 48/18 |
| 9,363,845 | B1 * | 6/2016 | Sahoo ................... | H04W 76/20 |
| 9,743,452 | B2 * | 8/2017 | Su ......................... | H04W 76/16 |
| 10,362,617 | B2 * | 7/2019 | Serna .................. | H04L 63/0853 |
| 10,547,651 | B2 * | 1/2020 | Mathias .............. | H04L 65/1016 |
| 10,728,775 | B2 * | 7/2020 | Savalle ............... | H04W 64/003 |
| 10,952,110 | B2 * | 3/2021 | Rugeland .......... | H04W 36/0079 |
| 11,323,937 | B2 * | 5/2022 | Kim ..................... | H04W 88/06 |
| 2009/0122772 | A1 | 5/2009 | Jung | |
| 2011/0261787 | A1 | 10/2011 | Bachmann et al. | |
| 2014/0146787 | A1 | 5/2014 | Cherian et al. | |
| 2014/0274006 | A1 | 9/2014 | Mutya et al. | |
| 2015/0350983 | A1 * | 12/2015 | Kwok ................. | H04L 65/1016 370/331 |
| 2016/0142467 | A1 | 5/2016 | Ban et al. | |
| 2016/0337942 | A1 * | 11/2016 | Catovic ................ | H04W 48/17 |
| 2016/0353334 | A1 | 12/2016 | Kim et al. | |
| 2017/0289894 | A1 | 10/2017 | Palm et al. | |
| 2019/0068587 | A1 | 2/2019 | Zhao et al. | |

FOREIGN PATENT DOCUMENTS

| | | |
|---|---|---|
| KR | 10-2009-0047866 A | 5/2009 |
| KR | 10-2011-0036464 A | 4/2011 |
| KR | 10-2015-0008283 A | 1/2015 |
| KR | 10-2015-0090123 A | 8/2015 |
| KR | 10-2015-0132250 A | 11/2015 |
| KR | 10-2016-0057873 A | 5/2016 |
| KR | 10-2016-0140265 A | 12/2016 |

OTHER PUBLICATIONS

Korean Office Action with English translation dated Nov. 24, 2021; Korean Appln. No. 10-2018-0005701.

* cited by examiner

ELECTRONIC DEVICE FOR PROVIDING CALL CONTINUITY IN WEAK ELECTRIC FIELD ENVIRONMENT AND CONTROL METHOD

CROSS-REFERENCE TO RELATED APPLICATION(S)

This application is a continuation application of prior application Ser. No. 16/957,531, filed on Jun. 24, 2020, which is a National Phase Entry of PCT International Application No. PCT/KR2018/016955, which was filed on Dec. 31, 2018 and claims priority to Korean Patent Application No. 10-2018-0005701, which was filed on Jan. 16, 2018, the contents of which are incorporated herein by reference.

BACKGROUND

1. Field

The present disclosure relates to an electronic device for providing call continuity in a weak electric field environment and a method of controlling the electronic device.

2. Description of the Related Art

With the wide spread of electronic devices such as smart phones, various techniques for supporting functions of the electronic devices have been provided. For example, various modules storing information for identifying (i.e., authentication) a use authority of a user of an electronic device, e.g., a user identification module (UIM), a subscriber identification module (SIM), and a universal subscriber identity module (USIM) have been provided. The SIM is a module storing information for providing various services such as charging or security to the user of the electronic device, and the electronic device may be classified into a single type or a multi (or dual) type according to the number of SIMs inserted (e.g., connected) to the electronic device.

SUMMARY

In an electronic device supporting a multi type, the electronic device may be connected with a plurality of SIMs (e.g., may include SIMs) supporting a network provided by different network operators (e.g., SK Telecom® or KT®). When the electronic device supporting the multi type enters a weak electric field environment (e.g., a weak electric field state) of a network being used by the electronic device during data transmission and reception by using any one SIM (which may be mentioned as a first SIM herein for convenience of a description), data transmission and reception may be stopped even though the electronic device is connected with the plurality of SIMs. For example, during a call (e.g., a Voice over Long Term Evolution (LTE) (VoLTE) call) with an external electronic device made by the user through a network (which may be mentioned as a "first operator network" or a "first network" herein for convenience of a description) provided by a first network operator (e.g., SK Telecom®), when the electronic device enters a weak electric field environment of the first operator network, the electronic device may switch to a second operator network by using another SIM (which may be mentioned as a "second operator network" or a "second network") provided by a second network operator (e.g., KT®) and stop (e.g., drop) the call without maintaining the call. A case where the electronic device enters the weak electric field environment may include a case where the electronic device enters the weak electric field environment along with movement of the electronic device and a case where a network environment changes to the weak electric field environment due to a change in a signal reception state even when the electronic device does not move.

According to various embodiments of the present disclosure, there is provided an electronic device that hands over to a second operator network to transmit and receive data through the second operator network when the electronic device enters a weak electric field environment during data transmission and reception through a first operator network, thereby providing call continuity.

According to various embodiments of the present disclosure, there is provided a computer-readable recording medium having stored therein operations in which an electronic device hands over to a second operator network to transmit and receive data through the second operator network when the electronic device enters a weak electric field environment during data transmission and reception through a first operator network, thereby providing call continuity.

An electronic device according to various embodiments of the present disclosure includes a processor, and a wireless communication circuit operatively connected with the processor, in which the processor is configured to identify a reception state of a first radio signal transmitted from a first operator network that is at least partially based on a first subscriber identification module, the first radio signal being received through the wireless communication circuit, when the electronic device is connected with the first operator network, to perform a handover to a second operator network that is at least partially based on a second subscriber identification module from the first operator network, at least based on the determination, to request authentication for receiving the first radio signal from an authentication server of the first operator network through the second operator network connected with the electronic device based on the handover, and to receive the first radio signal by the wireless communication circuit through the second operator network, at least based on a result of the authentication.

A computer-readable recording medium according to various embodiments of the present disclosure has stored therein instructions configured to perform at least one operation by a processor, the at least one operation including identifying a reception state of a first radio signal transmitted from a first operator network that is at least partially based on a first subscriber identification module, when an electronic device is connected with the first operator network, performing a handover to a second operator network that is at least partially based on a second subscriber identification module from the first operator network, at least based on the determination, requesting authentication for receiving the first radio signal from an authentication server of the first operator network through the second operator network connected with the electronic device based on the handover, and receiving the first radio signal by the wireless communication circuit through the second operator network, at least based on a result of the authentication.

An electronic device according to various embodiments of the present disclosure includes a processor, a wireless communication circuit operatively connected with the processor, and a first subscriber identification module and a second subscriber identification module that are inserted into the electronic device through a slot provided in the electronic device, in which the processor is configured to identify a reception state of a first radio signal transmitted from a first operator network that is at least partially based on the first subscriber identification module and a reception state of a second radio signal transmitted from a second operator network that is at least partially based on the second subscriber identification module, the first radio signal and the second radio signal being received through the wireless communication circuit, when the electronic device executes a call with an external electronic device by being connected with the first operator network, to perform a handover to a second operator network that is at least partially based on the second subscriber identification module from the first operator network, at least partially based on the determination, to perform authentication for executing the call with an authentication server connected through an enhanced packet data gateway (ePDG) of the first operator network, through the second operator network connected with the electronic device based on the handover, and to receive the first radio signal including data related to the call by the wireless communication circuit through the second operator network, upon completion of the authentication.

According to various embodiments of the present disclosure, when an electronic device enters a weak electric field environment during data transmission and reception through a first operator network, the electronic device hands over to a second operator network to transmit and receive data through the second operator network, thereby providing call continuity.

Effects according to various embodiments of the present disclosure are not limited to the described effects, and it would be obvious to those of ordinary skill in the art that various effects are included in the present disclosure.

DETAILED DESCRIPTION

Herein, although ordinal numbers such as "first," "second," and so forth will be used to describe various components, those components are not limited herein. The terms are used only for distinguishing one component from another component. For example, a first element may be named as a second element without departing from the right scope of the various exemplary embodiments of the disclosure, and similarly, a second element may be named as a first element. The term "and/or" used herein includes any and all combinations of one or more of the associated listed items.

Figure 1:
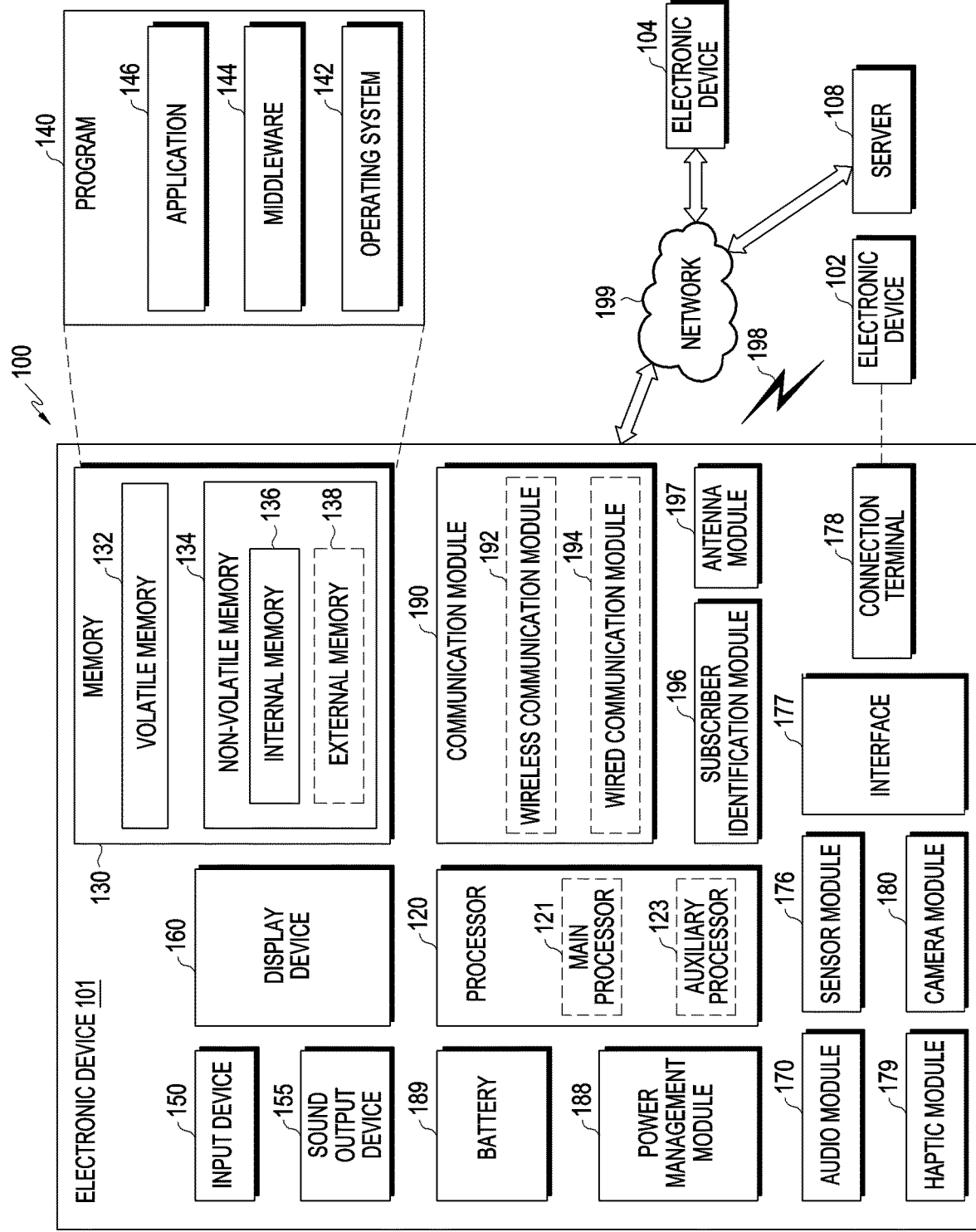
FIG. 1 is a block diagram of an electronic device in a network environment, according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a pen input device (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wireless-Fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one or more antennas including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the present disclosure, commands or data may be transmitted or received between the electronic device 101 and the external electronic device 104 via the server 108 coupled with the second network 199. Each of the electronic device 102 and the electronic device 104 may be a device of the same type as or a different type than the electronic device 101. According to an embodiment, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
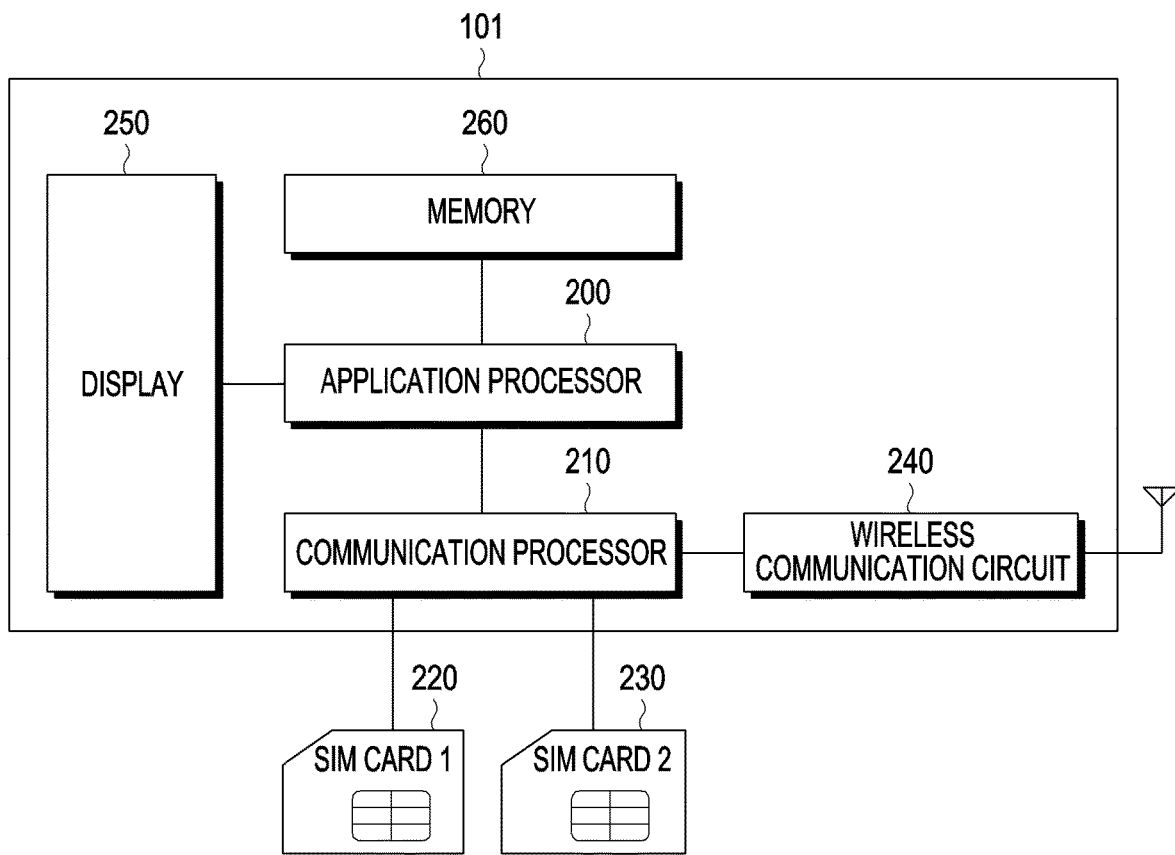
FIGS. 2A and 2B are diagrams for describing an electronic device, according to various embodiments.
Figure 2B:
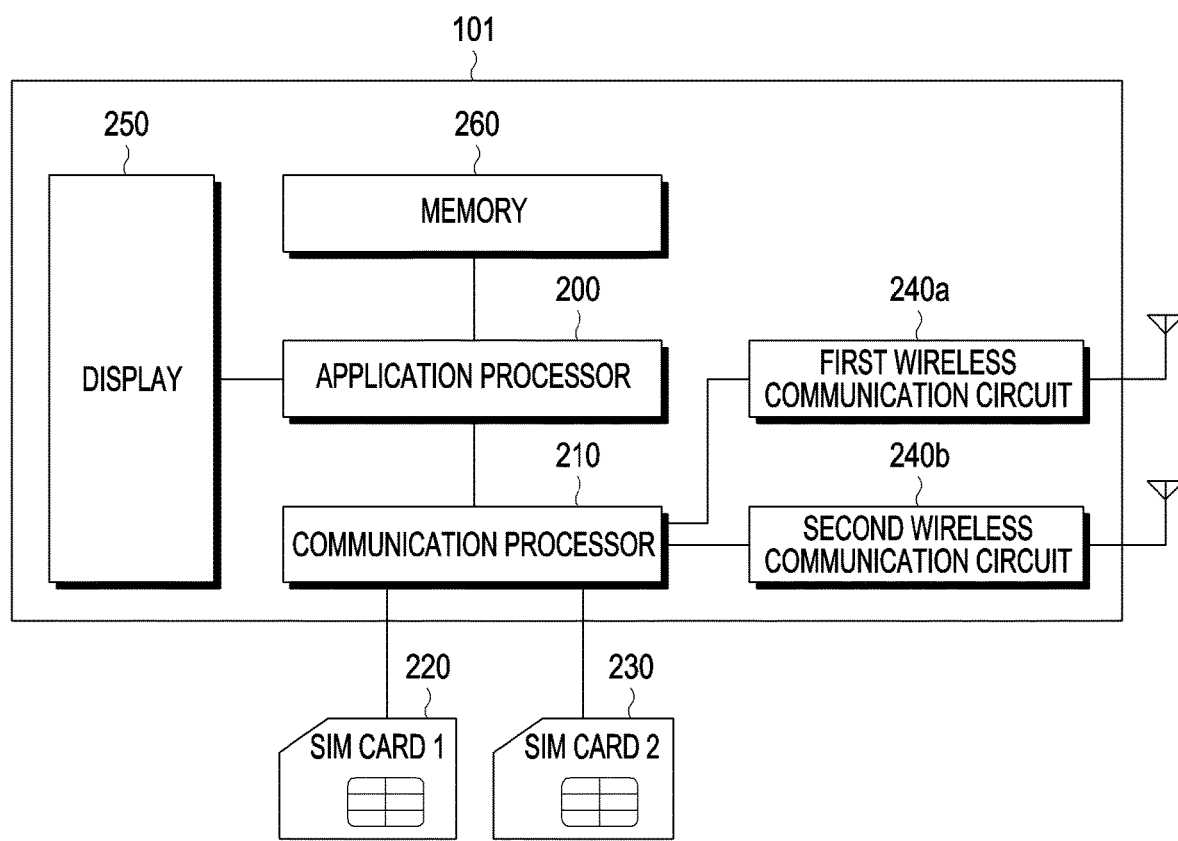

FIGS. 2A and 2B are diagrams for describing an electronic device according to various embodiments.

Referring to FIG. 2A, the electronic device 101 according to various embodiments of the present disclosure may include at least some of an application processor 200, a communication processor 210, a first subscriber identification module (SIM) 220, a second SIM 230, a wireless communication circuit 240, a display 250, or a memory 260.

The application processor 200 according to various embodiments of the present disclosure may drive, e.g., software (e.g., the program 140) to control at least one other component (e.g., a hardware or software component) of the electronic device 101 connected with the application processor 200 and may perform various operations. The application processor 200 according to various embodiments of the present disclosure may load a command or data received from another component (e.g., the display 250 or the memory 260) of the electronic device 101 in a volatile memory (e.g., the volatile memory 132 of FIG. 1) and process the same, and store resultant data in a non-volatile memory (e.g., the non-volatile memory 134 of FIG. 1).

The communication processor 210 according to various embodiments of the present disclosure may support establishing a wired or wireless communication channel between the electronic device 101 of FIG. 1 and an external electronic device (e.g., the electronic device 104 of FIG. 1 or the server 108 of FIG. 1) and performing communication through the established communication channel. The communication processor 210 according to various embodiments of the present disclosure may include a first communication processor (not shown) supporting a cellular communication scheme (e.g., VoLTE, Video over LTE (ViLTE), etc.) and a second communication processor (not shown) supporting other communication schemes (e.g., WiFi, VoWiFi, etc.) supporting communication schemes (e.g., WiFi, VoWiFi, etc.) other than the cellular communication scheme. According to various embodiments of the present disclosure, the first communication processor and the second communication processor may be implemented separately, integrally into one chip, or integrally with the wireless communication circuit 240. The communication processor 210 according to various embodiments of the present disclosure may be implemented with the application processor 200 according to various embodiments of the present disclosure as one chip.

The first SIM 220 and the second SIM 230 according to various embodiments of the present disclosure may store user information for identifying and authenticating the electronic device 101 in a network (e.g., the first operator network or the second operator network). The first SIM 220 and the second SIM 230 according to various embodiments of the present disclosure may be connected to operate with the communication processor 210 according to various embodiments of the present disclosure.

According to various embodiments of the present disclosure, the wireless communication circuit 240 may be operatively connected with the communication processor 210. The wireless communication circuit 240 according to various embodiments of the present disclosure may include a first wireless communication circuit for receiving various signals transmitted from a base station (e.g., an evolved NodeB (eNB)) of a network (e.g., the first operator network or the second operator network). The wireless communication circuit 240 according to various embodiments of the present disclosure may include a second wireless communication circuit for receiving various signals (e.g., a WiFi signal) transmitted from an access point (AP). The first communication processor and the second communication processor according to various embodiments of the present disclosure may be implemented with separate modules or integrally into one module. The wireless communication circuit 240 according to various embodiments of the present disclosure may transmit data regarding a received signal to the communication processor 210 according to various embodiments of the present disclosure. Herein, for convenience of a description, a signal transmitted from a base station of the first operator network or a signal transmitted from a base station of the second operator network may be briefly referred to as the signal transmitted from the first operator network or the signal transmitted from the second operator network. The use of such a term is intended for convenience of a description in various embodiments of the present disclosure, and it does not mean from the use of the term that a signal transmitted to the electronic device 101 according to various embodiments of the present disclosure is excluded from various components included in the first operator network or the second operator network except for the base station. The wireless communication circuit 240 according to various embodiments of the present disclosure may receive the signal transmitted from the first operator network and the signal transmitted from the second operator network at the same time.

The wireless communication circuit 240 according to various embodiments of the present disclosure may receive a radio signal (e.g., a WiFi signal) transmitted from an external electronic device (e.g., an AP) through an antenna connected to the wireless communication circuit 240. The electronic device 101 according to various embodiments of the present disclosure may perform communication with an external electronic device (e.g., the electronic device 102, the electronic device 104, or the server 108 of FIG. 1) by using the received radio signal. For example, the electronic device 101 according to various embodiments of the present disclosure may perform a VoWiFi call by using the radio signal received from the external device (e.g., the AP). The wireless communication circuit 240 according to various embodiments of the present disclosure may be implemented (or manufactured) integrally with a module (e.g., a Bluetooth module) for performing short-range wireless communication (e.g., Bluetooth).

The display 250 according to various embodiments of the present disclosure may visually provide information to the user of the electronic device 101 according to various embodiments of the present disclosure. The display device 250 according to various embodiments of the present disclosure may include touch circuitry or a pressure sensor capable of measuring the strength of a pressure for a touch.

The memory 260 according to various embodiments of the present disclosure may store various data, e.g., software (e.g., the program 140 of FIG. 1) and input data or output data for a command related to the software, used by at least one component (e.g., the application processor 200 or the communication processor 210) of the electronic device 101 according to various embodiments of the present disclosure. The memory 260 according to various embodiments of the present disclosure may include a volatile memory (e.g., the volatile memory 132 of FIG. 1) or a non-volatile memory (e.g., the non-volatile memory 134 of FIG. 1). The memory 260 according to various embodiments of the present disclosure may store user information for identifying and authenticating the electronic device 101 in a network (e.g., the first operator network or the second operator network). According to various embodiments of the present disclosure, the user information may be stored in the first SIM 220 and the second SIM 230 according to various embodiments of the present disclosure and may be stored in the memory 260 according to various embodiments of the present disclosure.

As shown in FIG. 2B, the electronic device 101 according to various embodiments of the present disclosure may include a plurality of wireless communication circuits (e.g., a first wireless communication circuit 240a and a second wireless communication circuit 240b) that receive a signal transmitted from a network corresponding to each SIM (e.g., the first SIM 220 and the second SIM 230). The first wireless communication circuit 240a according to various embodiments of the present disclosure may receive the signal transmitted from the first operator network (e.g., the base station of the first operator network). The second wireless communication circuit 240b according to various embodiments of the present disclosure may receive the signal transmitted from the second operator network (e.g., the base station of the second operator network). The first wireless communication circuit 240a and the second wireless communication circuit 240b according to various embodiments of the present disclosure may transmit data regarding the received signal to the communication processor 210 according to various embodiments of the present disclosure.

In FIGS. 2A and 2B, it is illustrated that the electronic device 101 according to various embodiments of the present disclosure is connected with two SIMs (e.g., the first SIM 220 and the second SIM 230), but this is merely an example. According to various embodiments of the present disclosure, the electronic device 101 may be connected with three or more SIMs.

Figure 2C:
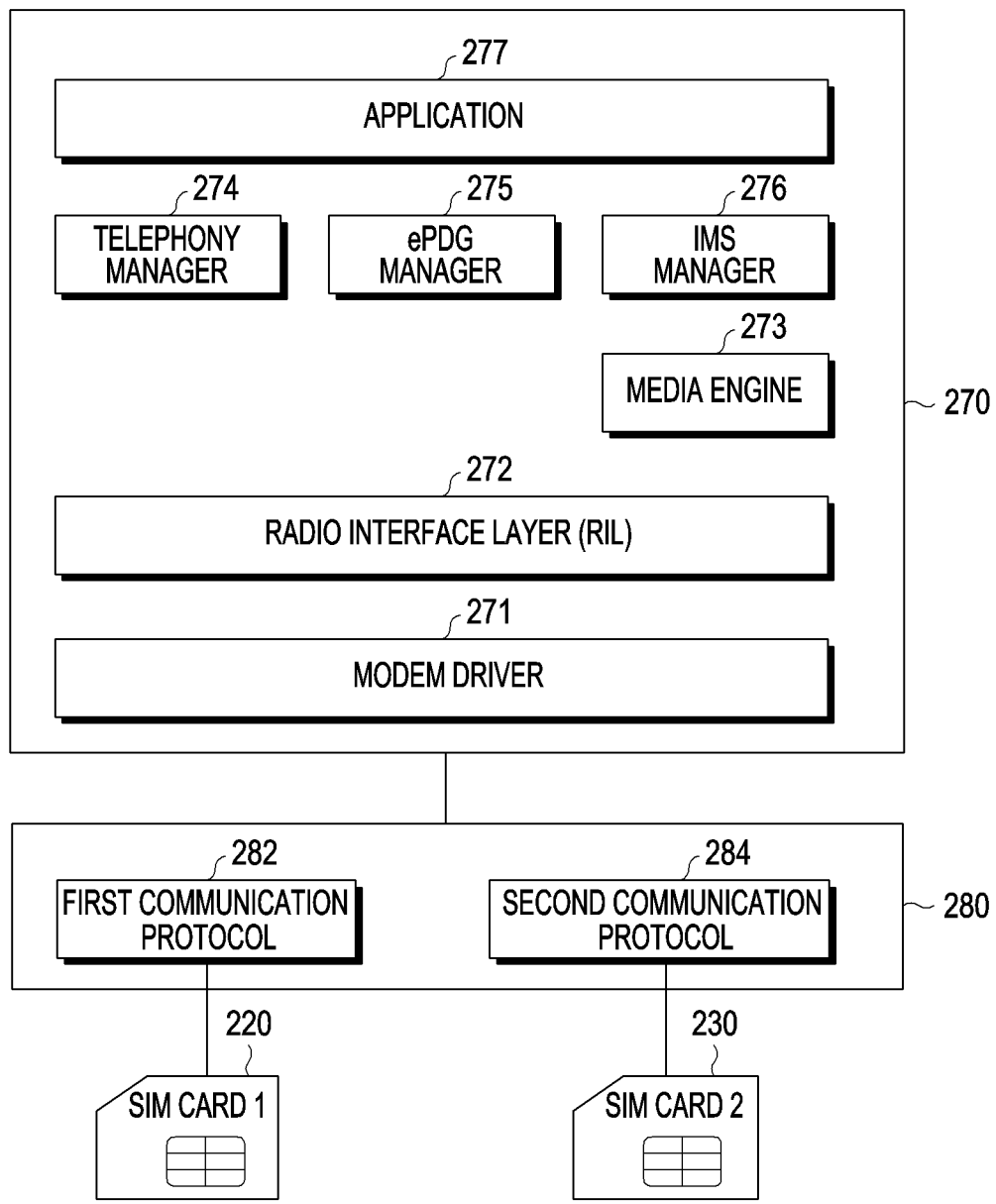
FIG. 2C is a diagram for describing a software architecture of a processor (e.g., an application processor and a communication processor) of an electronic device, according to various embodiments.

FIG. 2C is a diagram for describing a software architecture of a processor (e.g., the application processor 200 and the communication processor 210) of the electronic device 101, according to various embodiments.

The first program module 270 according to various embodiments of the present disclosure may be executed (or driven) by the application processor 200 according to various embodiments of the present disclosure. The first program module 270 according to various embodiments of the present disclosure may be stored in the memory 260 or the application processor 200 according to various embodiments of the present disclosure. The second program module 280 according to various embodiments of the present disclosure may be executed by the communication processor 210 according to various embodiments of the present disclosure. The second program module 280 according to various embodiments of the present disclosure may be stored in the memory 260 or the communication processor 210 according to various embodiments of the present disclosure.

Referring to FIG. 2C, the first program module 270 according to various embodiments of the present disclosure may include a modem driver 271, a radio interface layer (RIL) 272, a media engine 273, a telephony manager 274, an evolved packet data gateway (ePDG) manager 275, an integrated management support (IMS) manager 276, and an application 277. At least a part of the first program module 270 according to various embodiments of the present disclosure may be preloaded on the electronic device 101 according to various embodiments of the present disclosure or may be provided (e.g., downloaded) from an external electronic device (e.g., the electronic device 102 or 104, or the server 108).

The modem driver 271 according to various embodiments of the present disclosure may provide mutual communication between an operating system and a modem (e.g., the communication processor 210) of the electronic device 101 according to various embodiments of the present disclosure. The modem driver 271 according to various embodiments of the present disclosure may be included in a kernel.

The RIL 272 according to various embodiments of the present disclosure may provide an abstraction layer between telephony services (e.g., Android telephony services) and radio hardware. The RIL 272 according to various embodiments of the present disclosure may include support for radios based on a global system for mobile communication (GSM).

The media engine 273 according to various embodiments of the present disclosure may provide control over a wireless communication circuit (e.g., the wireless communication circuit 240) to receive call data (e.g., voice data and video data) received from a network (e.g., the first operator network or the second operator network). The call data mentioned herein may include data for performing various operations (e.g., user authentication, establishment of a security tunnel, transmission and reception of voice data, transmission and reception of video data) related to execution of a call (e.g., various calls such as a VoLTE call, a VoWiFi call, etc.). The media engine 273 according to various embodiments of the present disclosure may provide transmission of the call data received from the network to the IMS manager 276 and/or the application 277 according to various embodiments of the present disclosure. The media engine 273 according to various embodiments of the present disclosure may provide extraction of the call data from a signal received from the network. The media engine 273 according to various embodiments of the present disclosure may provide decoding of voice data and video data that are received from the network. The media engine 273 according to various embodiments of the present disclosure may be included in the second program module 280 according to various embodiments of the present disclosure, when the electronic device 101 according to various embodiments of the present disclosure supports a VoLTE call. The media engine 273 according to various embodiments of the present disclosure may be included in the first program module 280 according to various embodiments of the present disclosure, when the electronic device 101 according to various embodiments of the present disclosure supports a VoWiFi call.

The telephony manager 274 according to various embodiments of the present disclosure may provide an access to information about telephony services of the electronic device 101 according to various embodiments of the present disclosure. The telephony manager 274 according to various embodiments of the present disclosure may provide determination of a state (e.g., a received signal strength indicator (RSSI), a reference signal received power (RSRP), etc.) of a signal received in the electronic device 101 according to various embodiments of the present disclosure. The telephony manager 274 according to various embodiments of the present disclosure may provide an access to the first SIM 220 and the second SIM 230 according to various embodiments of the present disclosure.

The ePDG manager 275 according to various embodiments of the present disclosure may provide an access to an ePDG of a network (e.g., the first operator network or the second operator network) for user authentication. The ePDG manager 275 according to various embodiments of the present disclosure may provide determination of whether to perform a handover and execution of the handover, according to various embodiments of the present disclosure.

The IMS manager 276 according to various embodiments of the present disclosure may provide determination of voice quality or video quality during execution of a call with an external electronic device. The IMS manager 276 according to various embodiments of the present disclosure may be provided from the media engine 273 according to various embodiments of the present disclosure with the call data received from the network. The IMS manager 276 according to various embodiments of the present disclosure may provide communication with an IMS public data network (PDN) of a network or an IMS server. The IMS manager 276 according to various embodiments of the present disclosure may provide negotiation of a codec for executing the call with the external electronic device.

The application 277 according to various embodiments of the present disclosure may provide one or more applications capable of executing a function, for example, a home application, a dialer application, a short messaging service/multimedia messaging service (SMS/MMS) application, an instant message (IM) application, a browser application, a camera application, an alarm application, a contact application, a voice dial application, an e-mail application, a calendar application, a media player application, an album application, a clock application, a health care application (e.g., an application for measuring an exercise amount, blood sugar, etc.), or an environment information providing application (e.g., an application for providing air pressure, humidity, temperature information, etc.).

The second program module 280 according to various embodiments of the present disclosure may include data regarding a first protocol for performing communication with the first operator network (e.g., SK Telecom®) (which may be briefly mentioned as a "first communication protocol 282" herein) and data regarding a second protocol for performing communication with the second operator network (e.g., KT®) (which may be briefly mentioned as a "second communication protocol 284" herein). The first communication protocol 282 and the second communication protocol 284 according to various embodiments of the present disclosure may include a protocol according to wireless mobile communication standards (e.g., $3^{rd}$-Generation (3G), LTE, code division multiple access (CDMA), etc.), for example, a protocol stack for processing signaling (e.g., Access Stratum (AS), Non-Access Stratum (NAS), etc.) for wireless communication connection with a base station. That is, a protocol corresponding to an AS layer in charge of a control signal protocol with a UE and a radio access network (RAN) and an NAS layer in charge of a control signal protocol with a core network (CN) may be included. According to various embodiments of the present disclosure, the first communication protocol 282 and the second communication protocol 284 may include a protocol instance that performs an access to a network of the first network operator and a network of the second network operator. According to various embodiments of the present disclosure, the first communication protocol 282 may be associated with the first SIM 220 and the second communication protocol 284 may be associated with the second SIM 230.

The first program module 270 and the second program module 280 according to various embodiments of the present disclosure may be connected through inter-process communication (IPC).

Figure 2D:
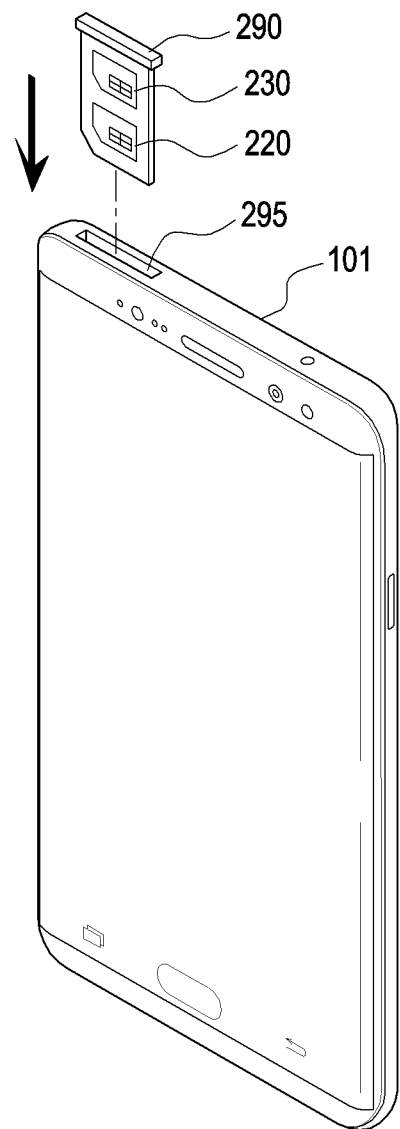
FIG. 2D is a diagram for describing an operation (e.g., a function) in which a plurality of (e.g., two) subscriber identification modules (SIMs) are inserted into an electronic device, according to various embodiments.

FIG. 2D is a diagram for describing an operation (e.g., a function) in which a plurality of (e.g., two) SIMs are inserted into an electronic device, according to various embodiments.

Referring to FIG. 2D, the first SIM 220 and the second SIM 230 according to various embodiments of the present disclosure may be mounted on a tray 290 and may be inserted into a slot 295 included on a surface of the electronic device 101. The first SIM 220 and the second SIM 230 inserted into the electronic device 101 according to various embodiments of the present disclosure may be operatively connected with the communication processor 210 or the application processor 200 according to various embodiments of the present disclosure.

The first SIM 220 and the second SIM 230 according to various embodiments of the present disclosure may be embedded in the electronic device 101 unlike shown in FIG. 2D. For example, the first SIM 220 and the second SIM 230 according to various embodiments of the present disclosure may be included in a processor (e.g., the application processor 200 or the communication processor 210 of FIG. 2A) or may be operatively connected with a processor (e.g., the application processor 200 or the communication processor 210 of FIG. 2A) in the electronic device 101. While two SIMs are shown as an example in FIG. 2D for convenience of a description, the processor (e.g., the application processor 200 or the communication processor 210 of FIG. 2A) according to various embodiments of the present disclosure may be implemented to be connected with (or to include) three or more SIMs.

Figure 3A:
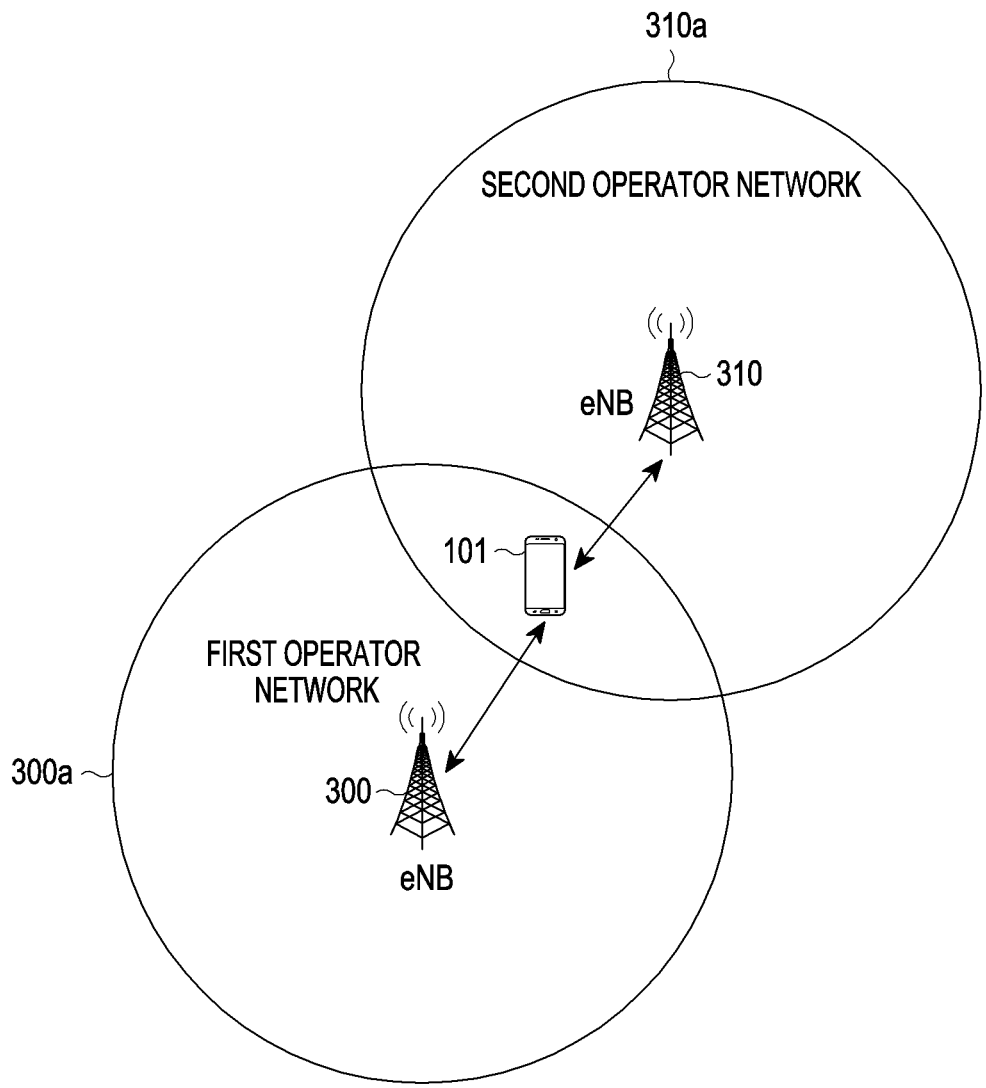
FIG. 3A is a diagram for describing an operation, performed by an electronic device, of detecting a signal transmitted from a second operator network based on a second SIM while making a call (e.g., a Voice over Long Term Evolution (LTE) (VoLTE) call) through a first operator network by using a first SIM, according to various embodiments.

FIG. 3A is a diagram for describing an operation, performed by an electronic device, of detecting a signal transmitted from a second operator network based on a second SIM while making a call (e.g., a VoLTE call) through a first operator network by using a first SIM, according to various embodiments.

Referring to FIG. 3A, the electronic device 101 according to various embodiments of the present disclosure may be included in a base station (e.g., a coverage 300a of an eNB 300) of a first operator network. The electronic device 101 according to various embodiments of the present disclosure may receive a signal transmitted from a base station of the first operator network by using a wireless communication circuit (e.g., the wireless communication circuit 240 of FIG. 2A). According to various embodiments of the present disclosure, the signal transmitted from the base station of the first operator network may include a signal for a VoLTE call. The electronic device 101 according to various embodiments of the present disclosure may be included in a base station (e.g., the coverage 310a of the eNB 310) of a second operator network. The electronic device 101 according to various embodiments of the present disclosure may receive a signal transmitted from the base station of the second operator network by using a wireless communication circuit (e.g., the wireless communication circuit 240 of FIG. 2A).

Figure 3B:
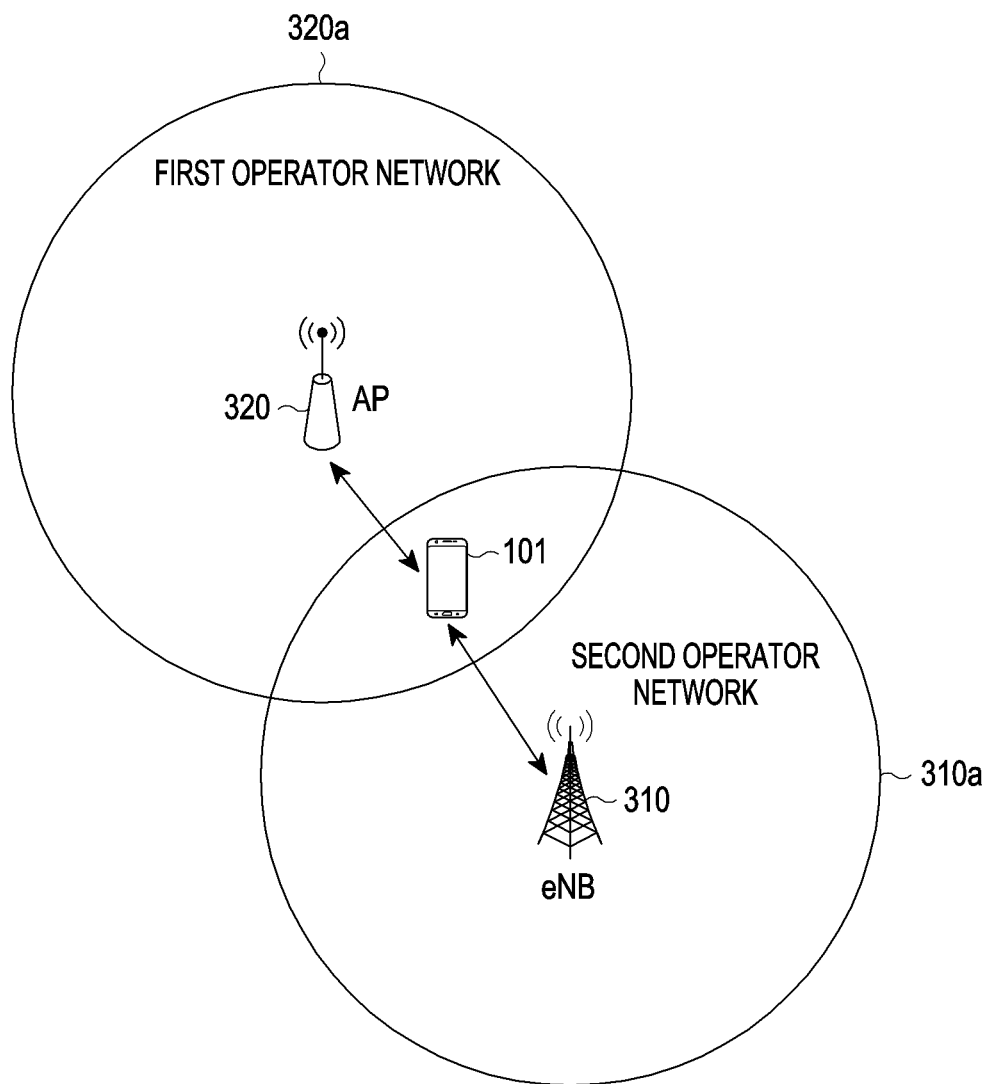
FIG. 3B is a diagram for describing an operation, performed by an electronic device, of detecting a signal transmitted from a second operator network based on a second SIM while making a call (e.g., a Voice over Wireless Fidelity (WiFi) (VoWiFi) call) through a first operator network by using a first SIM, according to various embodiments.

FIG. 3B is a diagram for describing an operation, performed by an electronic device, of detecting a signal transmitted from a second operator network based on a second SIM while making a call (e.g., a VoWiFi call) through a first operator network by using a first SIM, according to various embodiments.

Referring to FIG. 3B, the electronic device 101 according to various embodiments of the present disclosure may be included in a coverage 320a of an AP 320 of the first operator network. The electronic device 101 according to various embodiments of the present disclosure may receive a signal transmitted from the AP 320 of the first operator network by using a wireless communication circuit (e.g., the wireless communication circuit 240 of FIG. 2A). According to various embodiments of the present disclosure, the signal transmitted from the AP 320 of the first operator network may include a signal for a VoWiFi call. The electronic device 101 according to various embodiments of the present disclosure may be included in a base station (e.g., the coverage 310a of the eNB 310) of a second operator network. The electronic device 101 according to various embodiments of the present disclosure may receive a signal transmitted from the base station of the second operator network by using a wireless communication circuit (e.g., the wireless communication circuit 240 of FIG. 2A).

Figure 4:
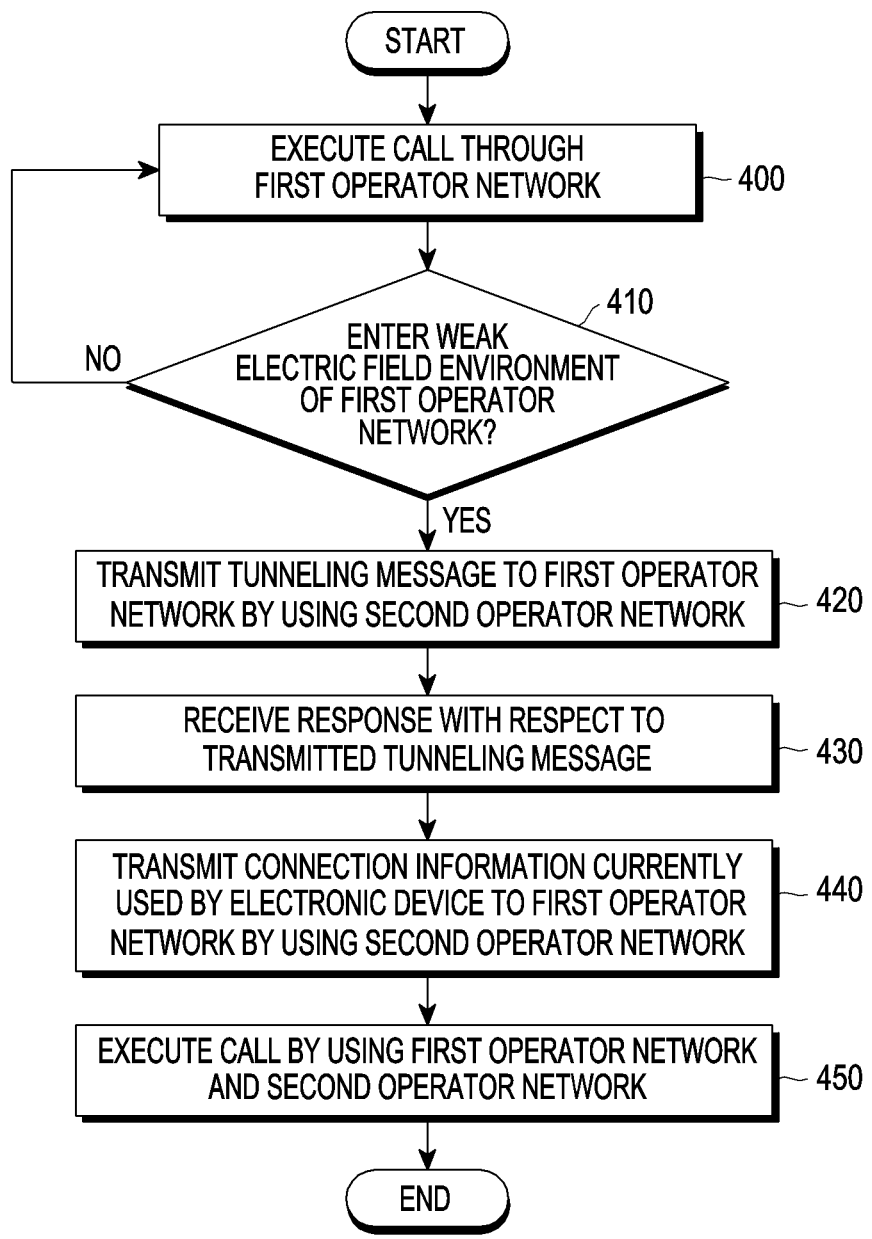
FIG. 4 is a diagram for describing an operating method of an electronic device, according to various embodiments.

FIG. 4 is a diagram for describing an operating method of an electronic device, according to various embodiments.

Referring to FIG. 4, an operating method of the electronic device 101 according to various embodiments of the present disclosure may include operation 400 in which an electronic device (e.g., the application processor 200 or the communication processor 210 of FIG. 2A) executes a call with an external electronic device through a first operator network by using a wireless communication circuit (e.g., the wireless communication circuit 240 of FIG. 2A). An electronic device (e.g., the electronic device 101 of FIG. 1) according to various embodiments of the present disclosure may support at least one of a dual SIM single standby (DSSS) type, a dual SIM dual active (DSDA) type, or a dual SIM dual standby (DSDS) type. An electronic device (e.g., the electronic device 101 of FIG. 1) according to various embodiments of the present disclosure may execute a call with the external electronic device through the first operator network based on at least one of a DSSS type, a DSDA type, or a DSDS type. When the electronic device (e.g., the electronic device 101 of FIG. 1) according to various embodiments of the present disclosure performs operation 400 based on the DSDA type or the DSDS type, operation 400 may further include an operation in which the electronic device connects to an Internet PDN of the second operator network based on a signal received from the second operator network. The electronic device (e.g., the electronic device 101 of FIG. 1) according to various embodiments of the present disclosure may be configured to connect to the Internet PDN of the second operator network when it is determined that the electronic device enters the weak electric field effect environment (e.g., after operation 410).

The electronic device (e.g., the electronic device 101 of FIG. 1) according to various embodiments of the present disclosure may be provided with connection information (e.g., an IP address) for use in connection to the Internet PDN of the second operator network from the second operator network (e.g., a PDN gateway (PGW) of the second operator network) in operation 400. Herein, for convenience of a description, the connection information for use in connection to the Internet PDN of the second operator network may be mentioned as various terms such as "first connection information" or a "first IP address". The electronic device (e.g., the electronic device 101 of FIG. 1) according to various embodiments of the present disclosure may be provided from the first operator network (e.g., the PGW of the first operator network) with connection information (e.g., an IP address of an IMS server of the first operator network provided to the electronic device in the first operator network for PDN communication channel connection) for receiving call (e.g., VoLTE call, VoWiFi call, etc.) data from the first operator network, in operation 400. The electronic device (e.g., the electronic device 101 of FIG. 1) according to various embodiments of the present disclosure may be provided from the first operator network (e.g., the PGW of the first operator network) with connection information (e.g., the IP address of the IMS server of the first operator network) for transmitting the call data to the first operator network (e.g., the IMS server of the first operator network), in operation 400. Herein, for convenience of a description, the connection information for receiving the call data from the first operator network may be mentioned as "second connection information" or a "second IP address", and the connection information for transmitting the call data to the first operator network may be mentioned as "third connection information" or a "third IP address". According to various embodiments of the present disclosure, a domain form may be provided to the electronic device (e.g., the electronic device 101 of FIG. 1) interchangeably/alternatively with an IP address. According to various embodiments of the present disclosure, an operation of obtaining the first IP address may be performed after operation 410, that is, after the electronic device enters the weak electric field environment of the first operator network.

An operating method of the electronic device 101 according to various embodiments of the present disclosure may include an operation in which the electronic device (e.g., the application processor 200 or the communication processor 210 of FIG. 2A) determines whether the electronic device enters the weak electric field environment of the network (e.g., the first operator network) currently used by the electronic device 101 according to various embodiments of the present disclosure in operation 410. According to various embodiments of the present disclosure, whether the electronic device enters the weak electric field environment may be made at least partially based on a state (e.g., the quality of a call, etc.) of a signal received from the first operator network.

An operating method of the electronic device 101 according to various embodiments of the present disclosure may include operation 420 (410-Y) in which the electronic device (e.g., the application processor 200 or the communication processor 210 of FIG. 2A) requests establishment of a security tunnel (e.g., an Internet protocol security (IPsec) tunnel) from the first operator network (e.g., an ePDG of the first operator network) by using the second operator network (e.g., the Internet PDN of the second operator network) through the wireless communication circuit (e.g., the wireless communication circuit 240 of FIG. 2A). According to various embodiments of the present disclosure, a request message for requesting establishment of the security tunnel may be transmitted to the ePDG of the first operator network through the Internet PDN provided by the second operator network. The electronic device (e.g., the processor 120 or the communication module 190 of FIG. 1) according to various embodiments of the present disclosure may request transmission of the request message for requesting establishment of the security tunnel to the currently used second operator network (e.g., the base station of the second operator network) as the electronic device enters the weak electric field environment of the first operator network. According to various embodiments of the present disclosure, the ePDG of the first operator network and the Internet PDN of the second operator network may be accessible to each other according to a communication policy between network operators.

The request message for requesting establishment of the security tunnel according to various embodiments of the present disclosure may include an IKEv2 message (e.g., IKE_AUTH Request). The request message for requesting establishment of the security tunnel according to various embodiments of the present disclosure may include an authentication request message for requesting authentication with respect to the electronic device. Authentication according to various embodiments of the present disclosure may include determination of whether the electronic device (e.g., the electronic device 101 of FIG. 1) (or a user of the electronic device) has an authority to use the first operator network. The electronic device according to various embodiments of the present disclosure may transmit an authentication request to the ePDG of the first operator network through the Internet PDN of the second operator network based on connection information regarding the ePDG of the first operator network stored in the electronic device (e.g., the memory 130 of FIG. 1) (e.g., a domain (e.g., a uniform resource locator (URL) indicating the ePDG of the first operator network or an IP address for connection to the ePDG of the first operator network)). The connection information regarding the ePDG of the first operator network according to various embodiments of the present disclosure may be obtained by the electronic device (e.g., the electronic device 101 of FIG. 1) through a DNS query for the ePDG. The connection information regarding the ePDG of the first operator network according to various embodiments of the present disclosure may be provided to the electronic device from various nodes of the first operator network. The connection information regarding the ePDG of the first operator network according to various embodiments of the present disclosure may be previously stored in the electronic device or a SIM (e.g., the first SIM 220 of FIG. 2A). According to various embodiments of the present disclosure, access information for the ePDG of the first operator network may be provided to the electronic device from an external electronic device (e.g., the electronic device 102, the electronic device 104, or the server 108 of FIG. 1). According to various embodiments of the present disclosure, the access information regarding the ePDG of the first operator network may be stored in the SIM (e.g., the first SIM 220 of FIG. 2A).

According to various embodiments of the present disclosure, when determining that the electronic device does not enter the weak electric field environment of the first network in operation 410 (410-N), the electronic device may continue executing a call with the external electronic device.

The operating method of the electronic device 101 according to various embodiments of the present disclosure may include operation 430 in which the electronic device (e.g., the application processor 200 or the communication processor 210 of FIG. 2A) receives a message (e.g., a response) corresponding to transmission of a tunneling message from the first operator network (e.g., the ePDG of the first operator network) by using the wireless communication circuit (e.g., the wireless communication circuit 240 of FIG. 2A) in operation 430. The response to the tunneling message according to various embodiments of the present disclosure may include an authentication key. The authentication key according to various embodiments of the present disclosure may be generated by the ePDG of the first operator network or the authentication server of the first operator network. The response to the tunneling message according to various embodiments of the present disclosure may include, for example, a response (e.g., IKE_AUTH Response) to the request for requesting establishment of the security tunnel.

The operating method of the electronic device 101 according to various embodiments of the present disclosure may include operation 440 in which the electronic device (e.g., the application processor 200 or the communication processor 210 of FIG. 2A) transmits connection information (e.g., a second IP address and a third IP address) currently used by the electronic device (e.g., the electronic device 101 of FIG. 1) to the first operator network (e.g., the ePDG of the first operator network) through the second operator network (e.g., the Internet PDN of the second operator network). Operation 440 according to various embodiments of the present disclosure may be understood as a request for registering (or re-registering or notifying) the connection information currently used by the electronic device (e.g., the electronic device 101 of FIG. 1) in the first operator network (e.g., the IMS server of the first operator network). The request for registering the connection information according to various embodiments of the present disclosure may include the authentication key provided to the electronic device from the first operator network according to operation 430. Operation 440 according to various embodiments of the present disclosure may have a meaning as a notification for notifying that the electronic device is to continuously use the currently used connection information (e.g., the second IP address and the third IP address) to the first network (e.g., the IMS server of the first operator network). Upon receiving the request for registering the currently used connection information from the electronic device, the ePDG (e.g., the ePDG of the first operator network) according to various embodiments of the present disclosure may transmit the received request to the PGW of the first operator network. As such, even when user (subscriber) authentication corresponding to operations 420 and 430 is newly (or again) executed through the operation of transmitting the request for registering the currently used connection information to the PGW of the first operator network, the PGW of the first operator network may not re-allocate new connection information to the electronic device. According to various embodiments of the present disclosure, the PGW of the first operator network having received the request for registering the connection information may transmit the received request to the IMS server of the first operator network. According to various embodiments of the present disclosure, the IMS server of the first operator network may store connection information (e.g., the second IP address and the third IP address) included in the request transmitted from the PGW of the first operator network. The electronic device according to various embodiments of the present disclosure may receive the message (e.g., response) corresponding to transmission of the connection information from the first operator network (e.g., the ePDG of the first operator network) through the second operator network (e.g., the Internet PDN of the second operator network) according to operation 440. According to various embodiments of the present disclosure, the operation of receiving the message (e.g., response) corresponding to transmission of the connection information from the first operator network (e.g., the ePDG of the first operator network) through the second operator network (e.g., the Internet PDN of the second operator network) according to operation 440 may be omitted.

Referring to FIG. 4, the operating method of the electronic device 101 according to various embodiments of the present disclosure may include operation 450 in which the electronic device (e.g., the application processor 200 or the communication processor 210 of FIG. 2A) executes a call with an external electronic device through the first operator network and the second operator network by using the wireless communication circuit (e.g., the wireless communication circuit 240 of FIG. 2A). According to various embodiments of the present disclosure, according to operation 440, the connection information (e.g., the second IP address or the third IP address) registered in the IMS server of the first operator network may be provided or may not be provided to a counterpart (e.g., the electronic device 104 of FIG. 1) that is executing a call with the electronic device (e.g., the electronic device 101 of FIG. 1).

Figure 5A:
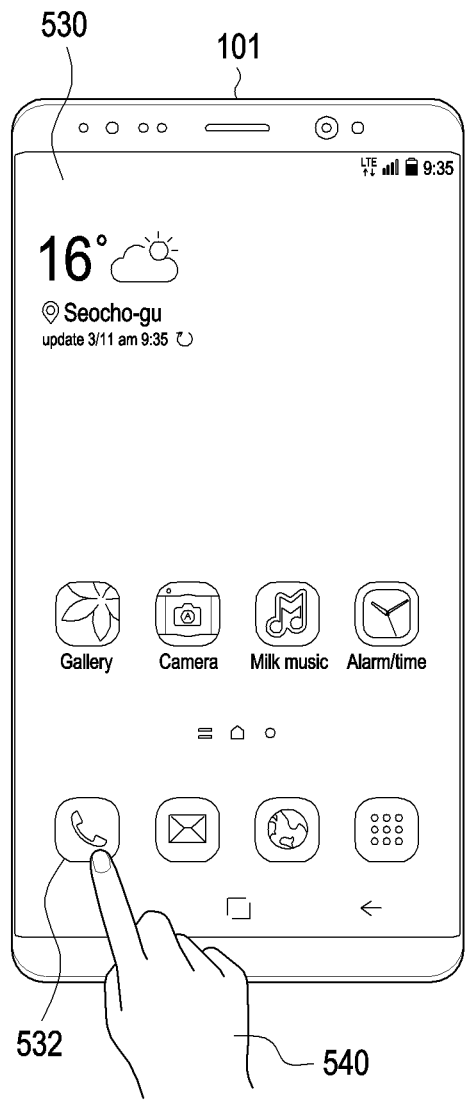
FIGS. 5A and 5B are diagrams for describing an operation, performed by an electronic device, of receiving from a user, a selection input with respect to any one of a plurality of (e.g., two) SIMs to make a call, according to various embodiments.
Figure 5B:
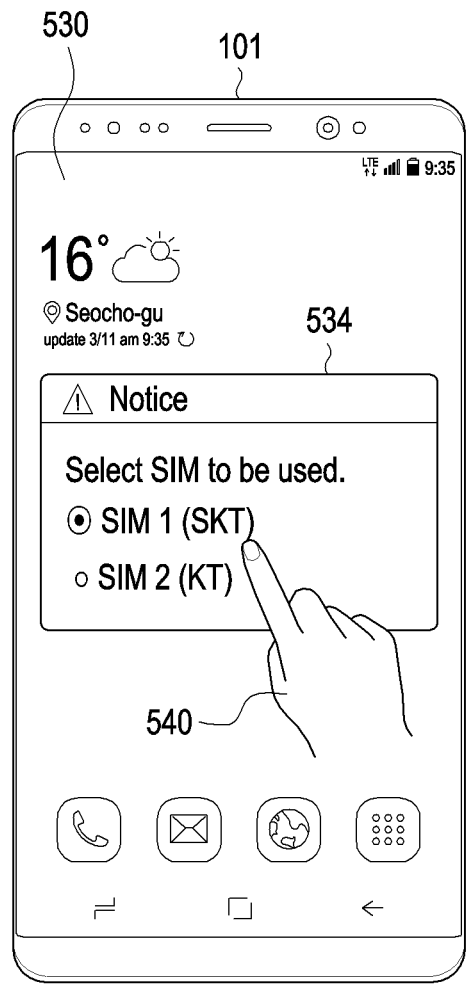

FIGS. 5A and 5B are diagrams for describing an operation, performed by an electronic device, of receiving from a user, a selection input with respect to any one of a plurality of (e.g., two) SIMs to make a call, according to various embodiments.

According to various embodiments of the present disclosure, a network (e.g., the first operator network) based on any one SIM (e.g., the first SIM 220 of FIG. 2A) of the first SIM (e.g., the first SIM 220 of FIG. 2A) and the second SIM (e.g., the second SIM 230 of FIG. 2A) may be designated as a primary network for executing a call (e.g., a VoLTE call). In this case, the electronic device 101 according to various embodiments of the present disclosure may execute a call through the primary network upon receiving an input for executing a call (e.g., a touch input with respect to the interface 532 for executing a call application) from the user, regardless of a user input for selecting the network. According to various embodiments of the present disclosure, as shown in FIGS. 5A and 5B, upon a user's selection input with respect to the network for executing a call, the call may be executed through the selected network.

Referring to FIG. 5A, the electronic device 101 according to various embodiments of the present disclosure may receive an input for executing a call (e.g., a touch input with respect to the interface 532 for executing a call application) from a user 540.

Referring to FIG. 5B, the electronic device 101 according to various embodiments of the present disclosure may receive a selection input of the user 540 with respect to any one network from a network list included in a notification message 534. The electronic device 101 according to various embodiments of the present disclosure may execute a call with a counterpart through the network selected by the user 540.

Figure 6A:
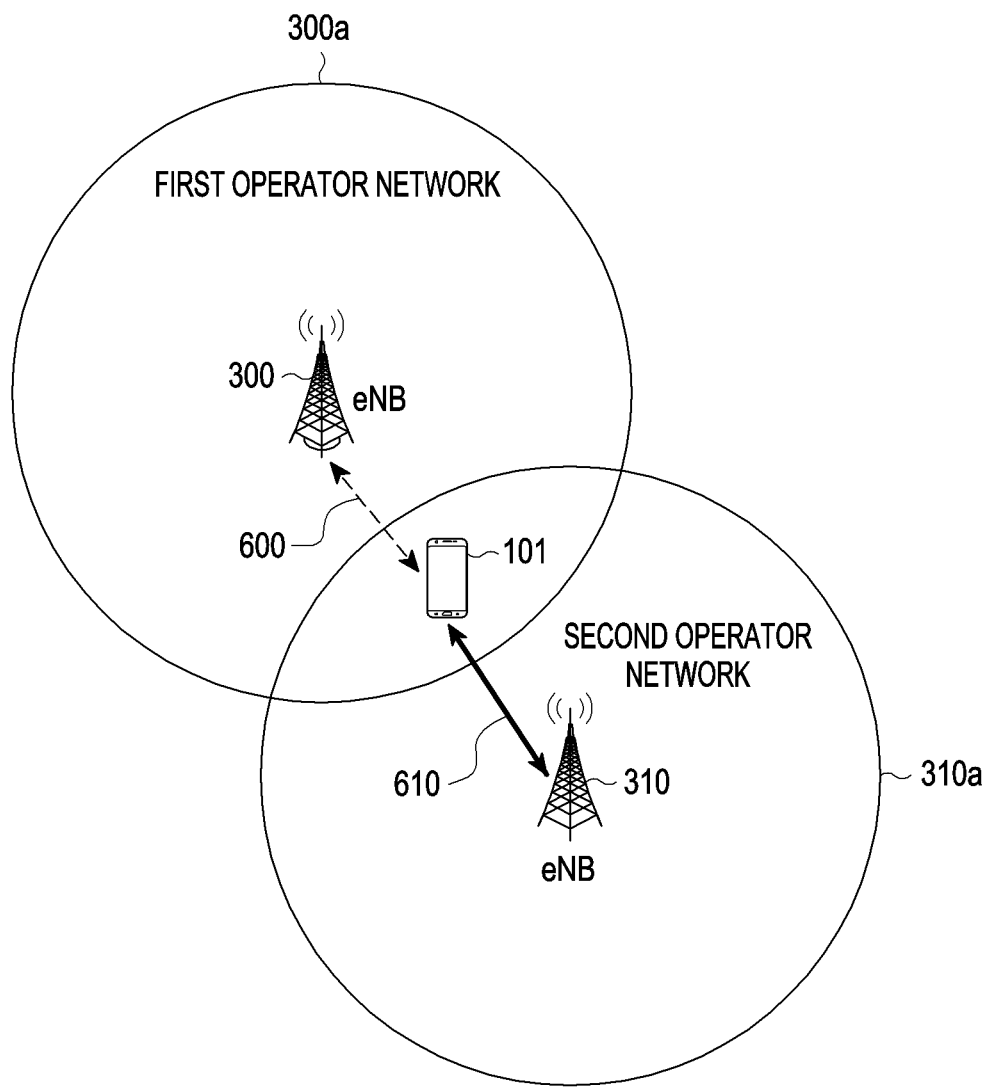
FIG. 6A is a diagram for describing a case where an electronic device enters a weak electric field environment, according to various embodiments.

FIG. 6A is a diagram for describing a case where an electronic device enters a weak electric field (weak signal) environment, according to various embodiments.

Referring to FIG. 6A, the electronic device 101 according to various embodiments of the present disclosure may be included in the base station (e.g., the coverage 300a of the eNB 300) of the first operator network. The electronic device 101 according to various embodiments of the present disclosure may be included in the base station (e.g., the coverage 310a of the eNB 310) of the second operator network. The electronic device 101 according to various embodiments of the present disclosure may receive a signal (e.g., a signal for executing a VoLTE call) from the base station of the first operator network. The electronic device 101 according to various embodiments of the present disclosure may receive a signal from the base station of the second operator network. The electronic device 101 according to various embodiments of the present disclosure may identify a state (i.e., call quality) of the signal received from the base station of the first operator network. The electronic device 101 according to various embodiments of the present disclosure may identify the state of the signal received from the base station of the first operator network based on information of at least some of signal strength information (e.g., a received signal strength indicator (RSSI)) received by the electronic device 101, transmission and reception speed information transmitted from the first operator network, transmission failure rate information of the signal transmitted from the first operator network, signal-to-noise ratio (SNR) information of the signal transmitted from the first operator network, perceptual evaluation of speech quality-wideband (PESQ-WB) information of the signal transmitted from the first operator network, or perceptual objective listening quality assessment (POLQA) information of the signal transmitted from the first operator network. For example, the electronic device 101 according to various embodiments of the present disclosure may identify that the state of the signal is the call quality (i.e., the electronic device 101 enters the weak electric field environment) which requires a handover to the second network operator, when an RSSI is less than a designated value (by dBm) or a POLQA mean opinion score (MOS) is less than a designated value (e.g., 2.0). The state of the signal received from the base station of the first operator network may be periodically or aperiodically identified by the electronic device 101 (e.g., the application processor 200 or the communication processor 210) according to various embodiments of the present disclosure. The electronic device 101 according to various embodiments of the present disclosure may identify, for example, a duration of silence of the call or the degree of noise with respect to the call being executed (including a voice call, a video call, and a combination thereof), based on at least partial information of information for identifying the state of the signal received from the base station of the first operator network. When the duration of silence is greater than or equal to a designated time or the degree of noise is greater than or equal to a designated reference, the electronic device 101 according to various embodiments of the present disclosure may determine that the state of the signal is the call quality requiring the handover to the second operator network. The electronic device 101 according to various embodiments of the present disclosure may identify the call quality (e.g., the duration of the silence of the call, the degree of noise with respect to the call being executed, etc.) by using other information or method as well as the at least partial information of the information for identifying the state of the signal received from the first operator network.

A dotted line 600 in FIG. 6A may mean that the electronic device 101 according to various embodiments of the present disclosure enters the weak electric field environment of the first operator network. A solid line 610 in FIG. 6A may mean that the electronic device 101 according to various embodiments of the present disclosure receives a signal capable of guaranteeing a quality greater than or equal to a designated call quality from the network (e.g., the second operator network) (e.g., a strong electric field environment).

Figure 6B:
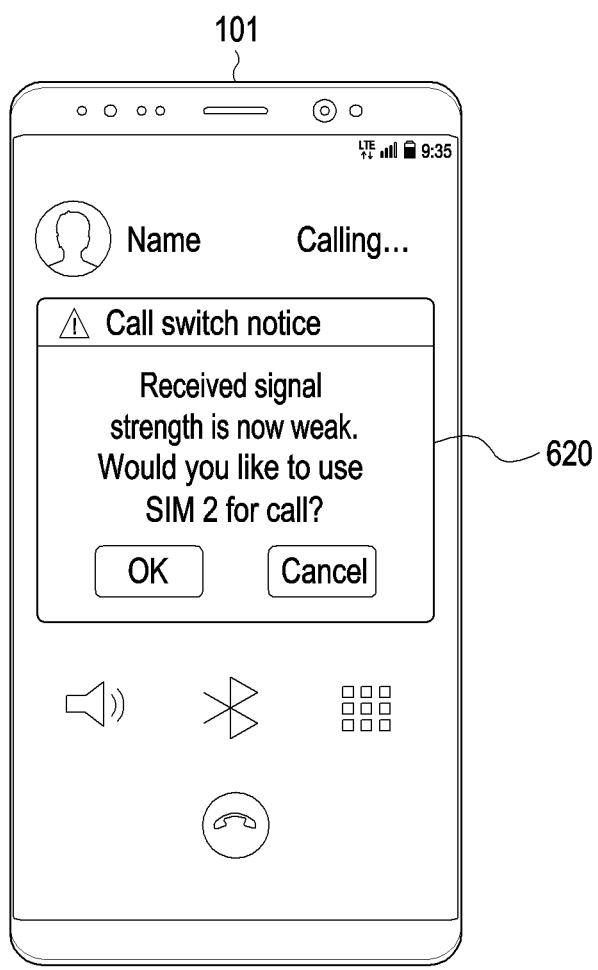
FIG. 6B is a diagram for describing an operation, performed by an electronic device, of determining whether to hand over based on a selection input of a user, when entering a weak electric field environment, according to various embodiments.

FIG. 6B is a diagram for describing an operation, performed by an electronic device, of determining whether to hand over based on a selection input of a user, when entering a weak electric field environment, according to various embodiments.

According to various embodiments of the present disclosure, as shown in FIG. 6A, when the electronic device 101 according to various embodiments of the present disclosure enters the weak electric field environment of the currently used network (e.g., the first operator network), the electronic device 101 may display a notification message 620 for switching (e.g., handing over) from the first operator network to the second operator network on a display (e.g., the display 250 of FIG. 2A) of the electronic device 101. The electronic device 101 (e.g., the application processor 200 or the communication processor 210 of FIG. 2A) according to various embodiments of the present disclosure may perform a handover according to a user's selection input with respect to the notification message 620. When the electronic device 101 according to various embodiments of the present disclosure enters the weak electric field environment of the first operator network regardless of the user's selection input, the electronic device 101 may perform a handover to the second operator network.

Figure 7:
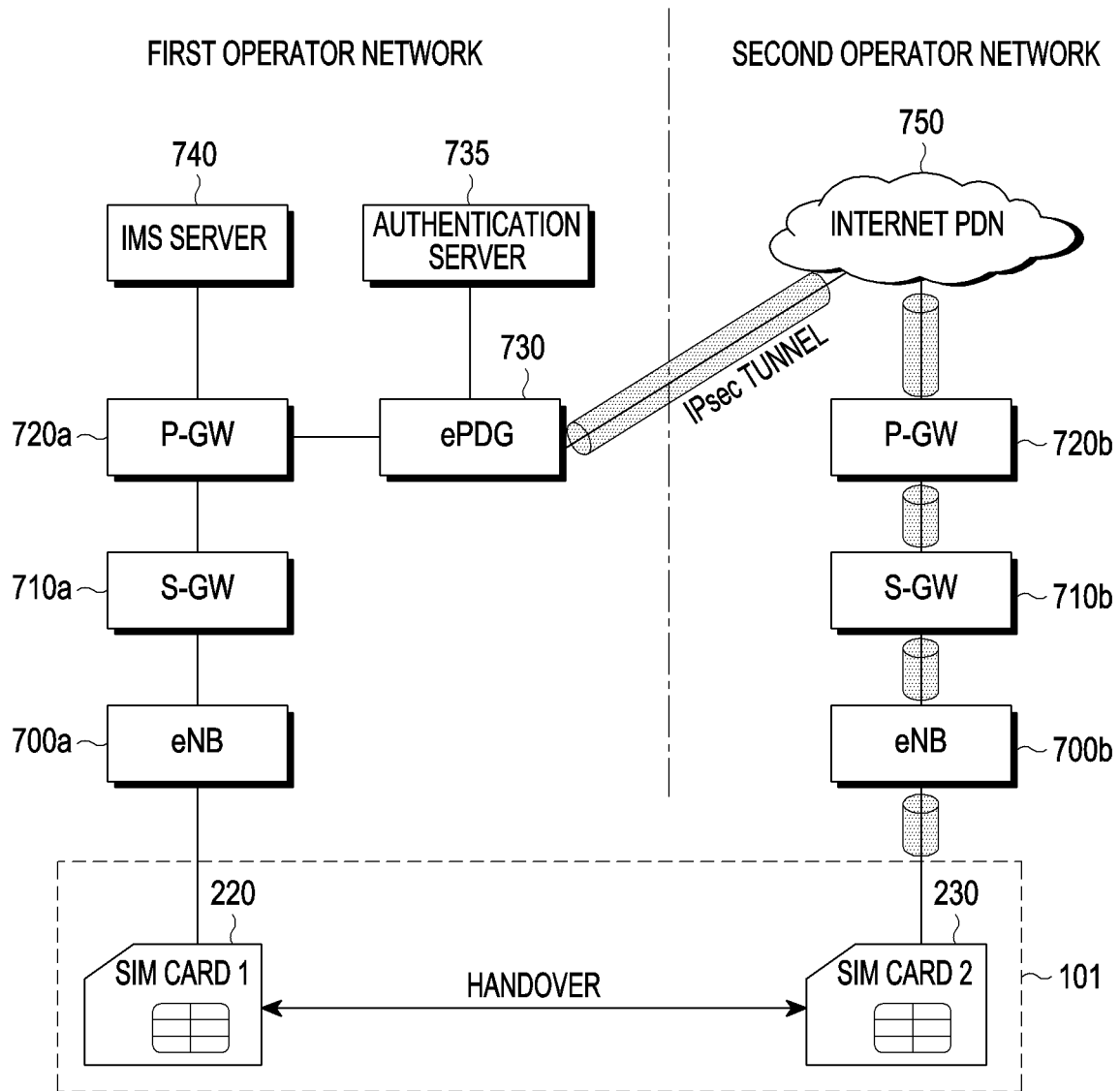
FIG. 7 is a diagram for describing an operation, performed by an electronic device, of performing authentication with a first operator network through a second operator network and establishing a security tunnel, according to various embodiments.

FIG. 7 is a diagram for describing an operation, performed by an electronic device, of performing authentication with a first operator network through a second operator network and establishing a security tunnel, according to various embodiments.

Referring to FIG. 7, the first operator network according to various embodiments of the present disclosure may include an eNB 700a, a serving gateway (S-GW) 710a, a P-GW 720a, an ePDG 730, an authentication server 735, and an IMS server 740. The second operator network according to various embodiments of the present disclosure may include an eNB 700b, an S-GW 710b, a P-GW 720b, and an Internet PDN 750.

The electronic device 101 according to various embodiments of the present disclosure may include the first SIM 220 storing subscriber identification information regarding the first operator network and the second SIM 230 storing subscriber identification information regarding the second operator network.

The eNBs 700a and 700b according to various embodiments of the present disclosure may mean a base station of an Evolved Universal Mobile Telecommunications System (UMTS) Terrestrial Radio Access Network (E-UTRAN). The S-GWs 710a and 710b according to various embodiments of the present disclosure may operate as a boundary node between a RAN and a CN. The S-GWs 710a and 710b according to various embodiments of the present disclosure may operate to maintain a data path between the eNB (e.g., the eNBs 700a and 700b) and the P-GWs 720a and 720b. The S-GWs 710a and 710b according to various embodiments of the present disclosure may serve as a local mobility anchor point when the electronic device (e.g., the electronic device 101 of FIG. 1) moves across an area served by the eNB (e.g., the eNBs 700a and 700b).

The P-GWs 720a and 720b according to various embodiments of the present disclosure may support policy enforcement features, packet filtering, charging, etc., for the electronic device (e.g., the electronic device 101 of FIG. 1). The P-GWs 720a and 720b according to various embodiments of the present disclosure may serve as an anchor point for mobility management with a 3rd-Generation Project Partnership (3GPP) network and a non-3GPP network (e.g., an interworking wireless local area network (I-WLAN), a CDMA network, a world interoperability for microwave access (WiMax), etc.). The P-GWs 720a and 720b according to various embodiments of the present disclosure may provide (or allocate) connection information (e.g., the first IP address) for connecting the electronic device 101 according to various embodiments of the present disclosure to the IMS server 740 of the first operator network or the Internet PDN 750 of the second operator network to the electronic device 101. Through the P-GWs 720a and 720b according to various embodiments of the present disclosure, the electronic device 101 according to various embodiments of the present disclosure may be connected to the IMS server 740 of the first operator network or the Internet PDN 750.

While FIG. 7 illustrates an embodiment where the S-GWs 710a and 710b according to various embodiments of the present disclosure and the P-GWs 720a and 720b according to various embodiments of the present disclosure are implemented as separate gateway devices, the S-GW 710a according to various embodiments of the present disclosure and the P-GW 720a according to various embodiments of the present disclosure may be implemented integrally as one gateway device or the S-GW 710b according to various embodiments of the present disclosure and the P-GW 720b according to various embodiments of the present disclosure may be implemented integrally as one gateway device.

The ePDG 730 according to various embodiments of the present disclosure may function as a security node for an untrusted non-3GPP network (e.g., an I-WLAN, WiFi hotspot, etc.). The ePDG 730 according to various embodiments of the present disclosure may be connected with the authentication server 735 according to various embodiments of the present disclosure.

The authentication server 735 according to various embodiments of the present disclosure may authenticate the electronic device 101 according to various embodiments of the present disclosure. Authentication according to various embodiments of the present disclosure may include user authentication required for receiving call data from the first operator network. The authentication server 735 according to various embodiments of the present disclosure may include, for example, a home subscriber server (HSS) or a 3GPP authentication, authorization, accounting (AAA) server. The HSS according to various embodiments of the present disclosure may mean a server storing subscriber information in the 3GPP network. The HSS according to various embodiments of the present disclosure may perform configuration storage, identity management, user state storage, etc. The 3GPP AAA server according to various embodiments of the present disclosure may provide authentication, authorization, and accounting in a user's computer resource access processing and service providing.

The IMS server 740 according to various embodiments of the present disclosure may mean a PDN providing a multimedia service such as voice, audio, video, etc., based on an IP. Through the IMS server 740 according to various embodiments of the present disclosure, the electronic device 101 according to various embodiments of the present disclosure may execute a call (e.g., a VoLTE call) with an external electronic device. The IMS server 740 according to various embodiments of the present disclosure may store an IP address allocated to the electronic device 101 according to various embodiments of the present disclosure and the external electronic device.

The electronic device 101 according to various embodiments of the present disclosure may perform a handover from the first operator network to the second operator network to provide call continuity in the weak electric field environment. The handover according to various embodiments of the present disclosure may mean processes (i.e., sequences) where the electronic device (e.g., the electronic device 101 of FIG. 1) performs designated operations (e.g., authentication, etc.) with various components (i.e., nodes) constituting a new network to connect (i.e., switch) to a new network (e.g., the second operator network) and is provided with a service from the new network.

The electronic device 101 according to various embodiments of the present disclosure may perform subscriber (i.e., user) authentication with the first operator network through the second operator network. The subscriber authentication according to various embodiments of the present disclosure may be performed with the authentication server 735 of the first operator network. The subscriber authentication according to various embodiments of the present disclosure may be performed based on extensible authentication protocol-authentication and key agreement (EAP-AKA). For the EAP-AKA, the Internet Engineering Task Force (IETF) Request for Comments (RFC) 4187 may be referred to.

The electronic device 101 according to various embodiments of the present disclosure may transmit an authentication request message to the ePDG 730 according to various embodiments of the present disclosure. The authentication request message according to various embodiments of the present disclosure may be included in the request message for requesting establishment of the security tunnel and may be transmitted to the first operator network (e.g., the ePDG 730 of the first operator network). The authentication request message (or the message for requesting establishment of the security tunnel (e.g., an IPsec tunnel) according to various embodiments of the present disclosure may be transmitted to the ePDG 730 through the Internet PDN 750 of the second operator network. In the electronic device 101 (e.g., the memory 130 of FIG. 1) according to various embodiments of the present disclosure, an IP address or domain for connecting to the ePDG 730 to perform subscriber authentication may be stored in advance. According to various embodiments of the present disclosure, the IP address or domain for connecting to the ePDG 730 stored in advance in the electronic device 101 may be information provided from the ePDG 730 at a particular point in time. The IP address or domain for connecting to the ePDG 730 according to various embodiments of the present disclosure may be stored in the first SIM 220. The IP address or domain for connecting to the ePDG 730 according to various embodiments of the present disclosure may be provided from an external electronic device (e.g., a dynamic host configuration protocol (DHCP) server (not shown)). In the electronic device 101 (e.g., the memory 260 of FIG. 1) according to various embodiments of the present disclosure and the authentication server 735 according to various embodiments of the present disclosure, identification information (e.g., an international mobile equipment identity (IEMI)) of the electronic device 101) for authenticating the subscriber and a unique device number of the electronic device 101 (e.g., a serial number of the electronic device 101) may be stored.

The electronic device 101 (e.g., the ePDG manager 275 of FIG. 2) according to various embodiments of the present disclosure may transmit an authentication request message (or a message for requesting establishment of a security tunnel) to the ePDG 730 according to various embodiments of the present disclosure, at least based on an IP address or domain stored in the electronic device 101. The authentication request message according to various embodiments of the present disclosure may include information for authenticating a subscriber (e.g., a subscriber subscribing to the first operator network).

Internet protocol security (IPsec) according to various embodiments of the present disclosure, which is a protocol developed to protect an IP, may mean a protocol for providing a security service such as confidentiality, integrity, access control, and data source authentication. An encryption algorithm and key values required for defining the security service may be mentioned as state information (security association, SA) of the IPSec, and IKE may mean a protocol for setting the state information of the IPsec. The information (e.g., state information, certificate information, digital signature information, etc., of the IPsec) for establishing a security tunnel according to various embodiments of the present disclosure may be stored in the authentication server 735 according to various embodiments of the present disclosure, the ePDG 730, or the external electronic device included in the first operator network. The information for establishing the security tunnel according to various embodiments of the present disclosure may be stored in the electronic device 101 (e.g., the memory 260 of FIG. 2A) or the SIM (e.g., the first SIM 220 of FIG. 2A) according to various embodiments of the present disclosure. The information for establishing the security tunnel according to various embodiments of the present disclosure may be included in the request message for requesting establishment of the security tunnel and may be transmitted to the ePDG 730 or the authentication server 735.

The ePDG 730 according to various embodiments of the present disclosure may establish the security tunnel (e.g., the IPsec tunnel) with the electronic device 101 according to various embodiments of the present disclosure, upon receiving the request message for requesting establishment of the security tunnel. The operation of establishing the security tunnel according to various embodiments of the present disclosure may include an operation of authenticating the electronic device 101. Authentication according to various embodiments of the present disclosure may be performed by the authentication server 735 or the ePDG 730. Upon completion of authentication of the electronic device 101, the ePDG 730 according to various embodiments of the present disclosure may establish the security tunnel between the electronic device 101 and the ePDG 730 by transmitting a response (e.g., an authentication key corresponding to completion of subscriber authentication) with respect to a tunnel establishment request (e.g., a tunneling message) transmitted from the electronic device 101 to the electronic device 101 through the Internet PDN 750 of the second operator network. For example, the ePDG 730 according to various embodiments of the present disclosure may transmit the response with respect to the tunnel establishment request to the electronic device by using the second connection information (e.g., the second IP address).

Herein, functions/operations for performing tunneling (or tunnel establishment) based on IKEv2 have been described for convenience of a description of various embodiments of the present disclosure, but tunneling may also be performed based on layer 2 tunneling protocol (L2TP)/IPsec according to various embodiments of the present disclosure.

Figure 8:
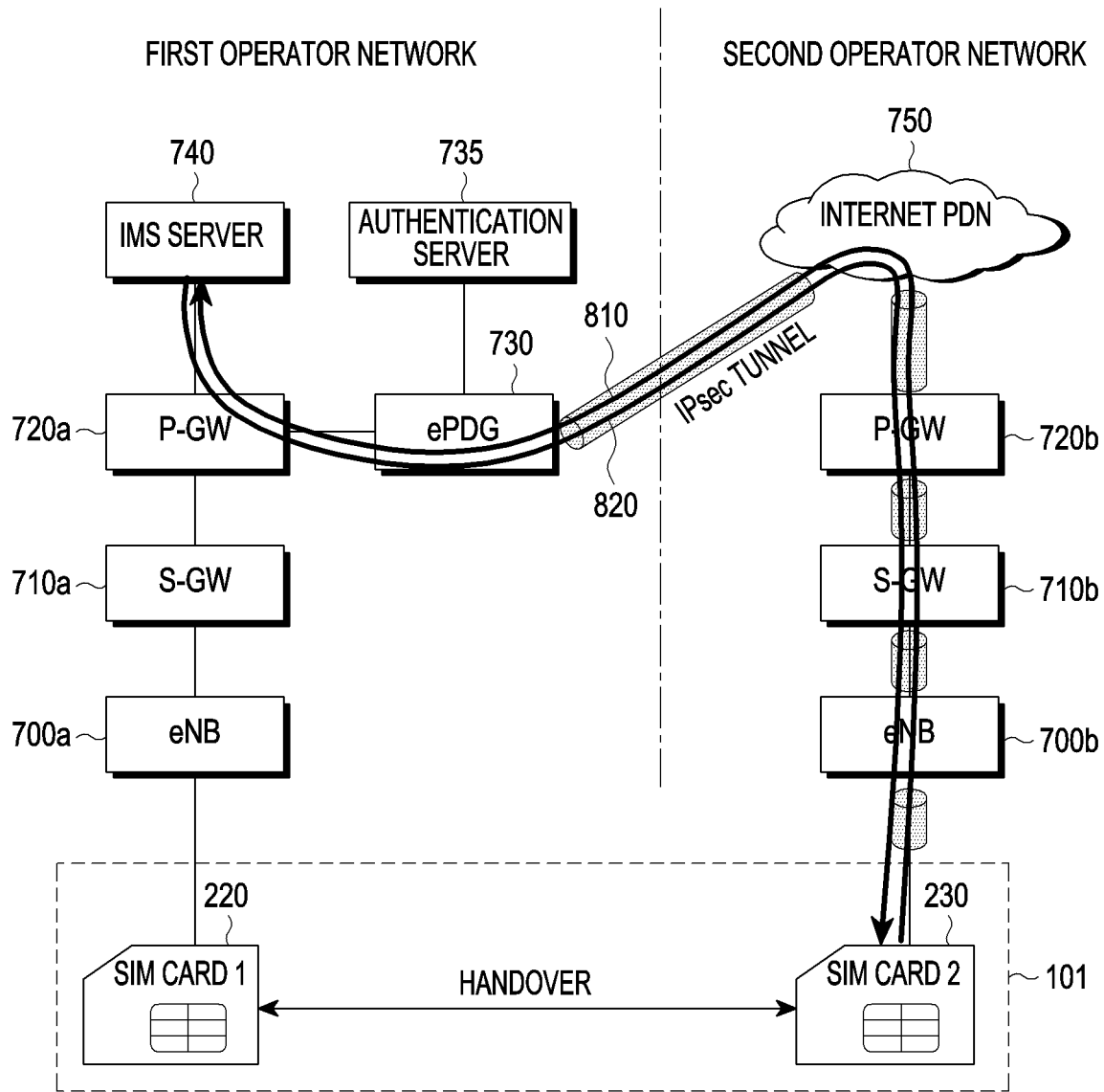
FIG. 8 is a diagram for describing an operation, performed by an electronic device, of transmitting and receiving call data through a first operator network and a second operator network, according to various embodiments.

FIG. 8 is a diagram for describing an operation, performed by an electronic device, of transmitting and receiving call data through a first operator network and a second operator network, according to various embodiments.

Referring to FIG. 8, the electronic device 101 according to various embodiments of the present disclosure may receive data (voice data and/or video data) for executing a call with the external electronic device from the IMS server 740 of the first operator network along a first path 810. The electronic device 101 according to various embodiments of the present disclosure may transmit the data (voice data and/or video data) for executing the call with the external electronic device to the IMS server 740 of the first operator network along a second path 820.

The first path 810 according to various embodiments of the present disclosure may include a path from the electronic device 101 to the IMS server 740 of the first operator network through the eNB 700b of the second operator network, the S-GW 710B of the second operator network, the P-GW 720b of the second operator network, the Internet PDN 750 of the second operator network, the ePDG 730 of the first operator network, and the P-GW 730 of the first operator network. The second path 820 according to various embodiments of the present disclosure may include a reverse order of the first path 810.

Figure 9A:
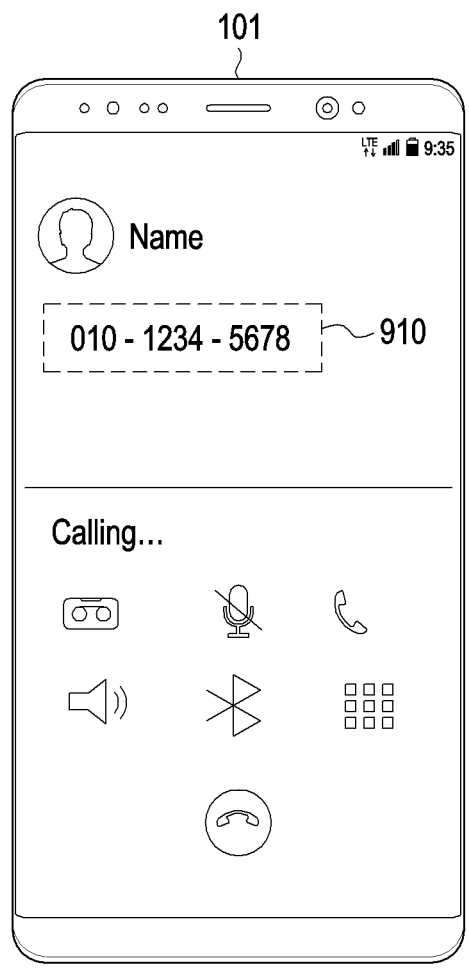
FIG. 9A is a diagram for describing an operation, performed by an electronic device, of providing a call through an identical user identification number after handing over to a second operator network, according to various embodiments.

FIG. 9A is a diagram for describing an operation, performed by the electronic device 101, of providing a call through an identical user identification number after handing over to a second operator network, according to various embodiments.

Referring to FIG. 9A, the electronic device 101 according to various embodiments of the present disclosure may execute a call with the external electronic device through the first operator network (i.e., by being connected with the first operator network). According to various embodiments of the present disclosure, an identification number (e.g., a phone number 910) of the external electronic device may be "010-1234-5678". The identification number of the external electronic device may be displayed on the electronic device 101 (e.g., the display 250 of FIG. 2A) according to various embodiments of the present disclosure. The electronic device 101 according to various embodiments of the present disclosure may execute the call with the external electronic device through the identical identification number (e.g., "010-1234-5678") as shown in FIG. 9A, even after the handover to the second operator network. The identification number of the external electronic device according to various embodiments of the present disclosure may be displayed on the electronic device 101 (e.g., the display 250 of FIG. 2A) according to various embodiments of the present disclosure, even after the handover.

Figure 9B:
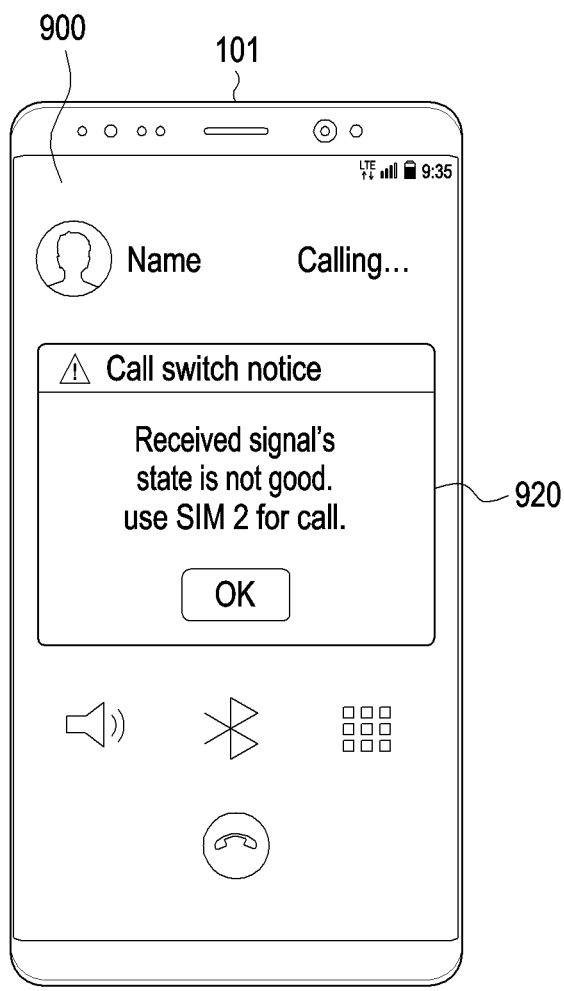
FIG. 9B is a diagram for describing an operation, performed by an electronic device, of providing a handover notification message to a user, according to various embodiments.

FIG. 9B is a diagram for describing an operation, performed by the electronic device 101, of providing a handover notification message to a user, according to various embodiments.

Referring to FIG. 9B, when the handover to the second operator network is performed, the electronic device 101 according to various embodiments of the present disclosure may display a notification message 920 indicating that the handover is executed on the electronic device 101 (e.g., the display 250 of FIG. 2A0 according to various embodiments of the present disclosure. The notification message 920 according to various embodiments of the present disclosure may be displayed on a phone application execution screen 900. According to various embodiments of the present disclosure, the electronic device 101 according to various embodiments of the present disclosure may output an acoustic (e.g., a notification sound) or tactile (e.g., vibration) notification message at the same time (or together) when the handover to the second operator network is performed.

At least some of various operations performed by the communication processor (e.g., the communication processor 210 of FIG. 2A) according to various embodiments of the present disclosure may be performed by the application processor (e.g., the application processor 200 of FIG. 2A) according to various embodiments of the present disclosure.

Figure 10A:
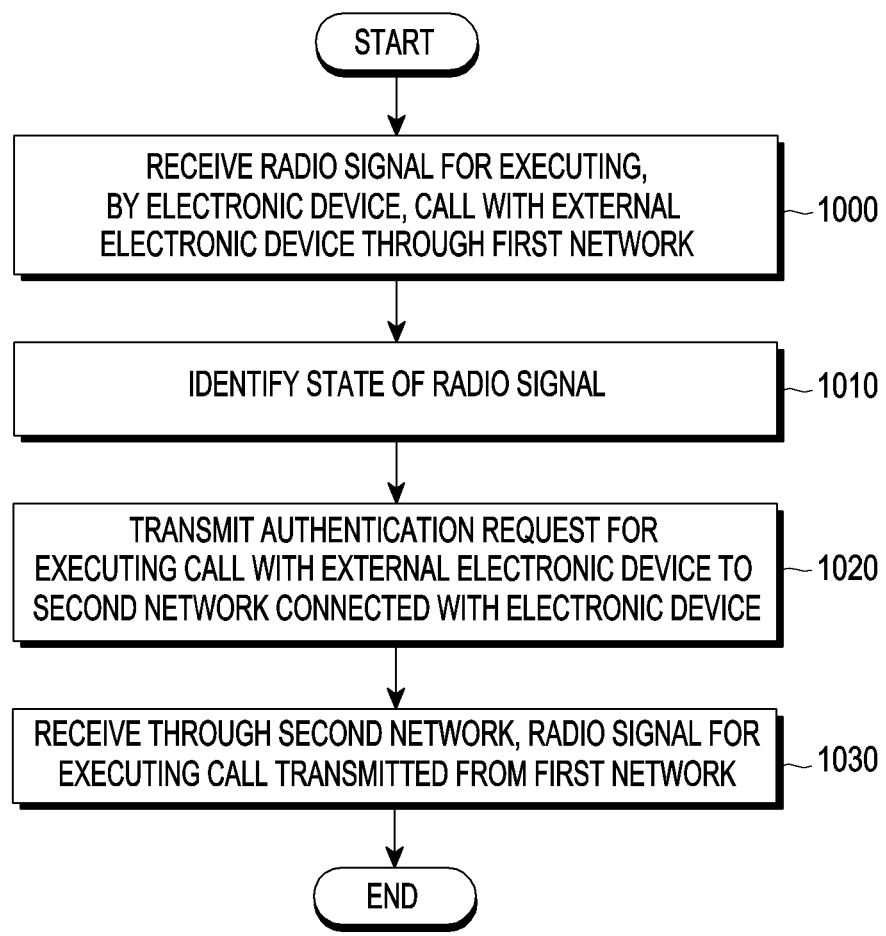
FIGS. 10A and 10B are diagrams for describing an operating method of an electronic device, according to various embodiments.
Figure 10B:
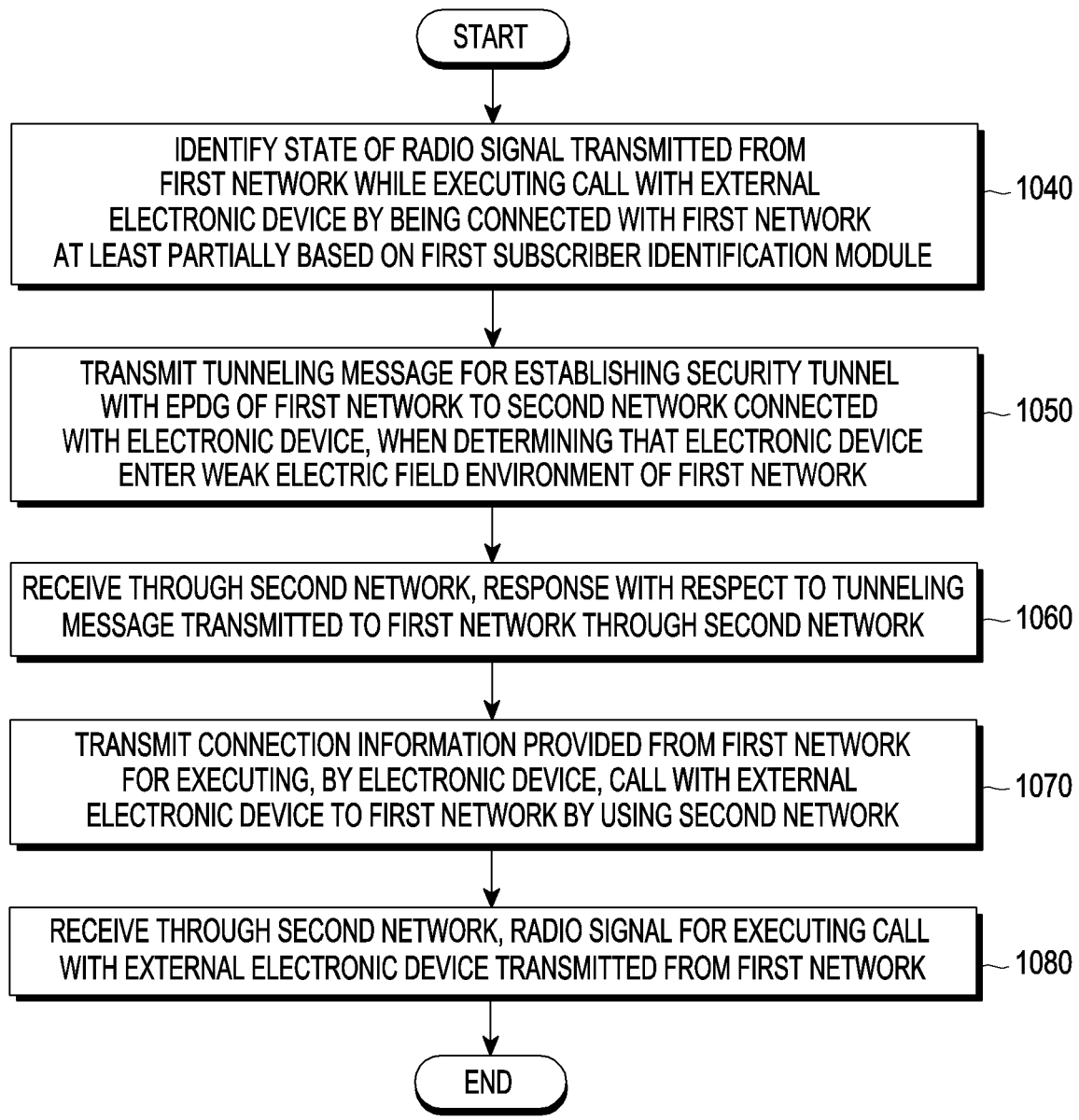

FIGS. 10A and 10B are diagrams for describing an operating method of the electronic device 101, according to various embodiments.

Referring to FIG. 10A, the electronic device 101 (e.g., the application processor 200 or the communication processor 210) according to various embodiments of the present disclosure may receive a radio signal for executing a call with the external electronic device through the first network in operation 1000.

The electronic device 101 (e.g., the application processor 200 or the communication processor 210 of FIG. 2A) according to various embodiments of the present disclosure may identify a state of the radio signal in operation 1010.

The electronic device 101 (e.g., the application processor 200 or the communication processor 210 of FIG. 2A) according to various embodiments of the present disclosure may transmit an authentication request for executing the call with the external electronic device to the second network connected with the electronic device, in operation 1020.

The electronic device 101 (e.g., the application processor 200 or the communication processor 210) according to various embodiments of the present disclosure may receive the radio signal for executing the call transmitted from the first network through the second network, in operation 1030.

Referring to FIG. 10B, the electronic device 101 (e.g., the application processor 200 or the communication processor 210) according to various embodiments of the present disclosure may identify the state of the radio signal transmitted from the first network, while executing the call with the external electronic device by being connected with the first network at least partially based on the first SIM, in operation 1040.

When determining that the electronic device 101 (e.g., the application processor 200 or the communication processor 210 of FIG. 2A) according to various embodiments of the present disclosure enters the weak electric field environment of the first network, the electronic device 101 may transmit the tunneling message for establishing a security tunnel with the ePDG of the first network to the second network connected with the electronic device, in operation 1050.

The electronic device 101 (e.g., the application processor 200 or the communication processor 210) according to various embodiments of the present disclosure may receive a response with respect to the tunneling message, which has been transmitted to the first network through the second network, through the second network in operation 1060.

The electronic device 101 (e.g., the application processor 200 or the communication processor 210 of FIG. 2A) according to various embodiments of the present disclosure may transmit connection information, provided from the first network to execute the call with the external electronic device, to the first network by using the second network, in operation 1070.

The electronic device 101 (e.g., the application processor 200 or the communication processor 210) according to various embodiments of the present disclosure may receive the radio signal for executing the call, transmitted from the first network, with the external electronic device through the second network, in operation 1080.

An electronic device (e.g., the electronic device 101 of FIG. 1) according to various embodiments of the present disclosure may include a processor (e.g., the processor 120 of FIG. 1), a memory (e.g., the memory 130 of FIG. 1) operatively connected with the processor, and a wireless communication circuit (e.g., the wireless communication circuit 240 of FIG. 2A) operatively connected with the processor and the memory, in which the processor is configured to control the wireless communication circuit to receive a radio signal for executing, by the electronic device, a call with an external electronic device, through a first network (e.g., the first operator network), to identify a state of the radio signal received through the wireless communication circuit, to control the wireless communication circuit to transmit an authentication request for executing the call to a second network (e.g., the second operator network) connected with the electronic device, at least partially based on a result of the identification with respect to the state of the radio signal, and to control the wireless communication circuit to receive the radio signal, transmitted from the first network, for executing the call with the external electronic device through the second network, at least partially based on a result with respect to the authentication request.

According to various embodiments of the present disclosure, the processor may be configured to obtain first connection information for connecting to an Internet PDN (e.g., the Internet PDN 750 of FIG. 7) of the second network from the second network through the wireless communication circuit, when the electronic device is connected with the first network.

According to various embodiments of the present disclosure, the first network may be at least partially based on a first SIM (e.g., the first SIM 220 of FIG. 2A) and the second network is at least partially based on a second SIM (e.g., the second SIM 230 of FIG. 2A), and the first SIM and the second SIM may be embedded in the processor or may be mounted in the electronic device to operate with the processor.

According to various embodiments of the present disclosure, the processor may be configured to control the wireless communication circuit to transmit the authentication request to an ePDG (e.g., the ePDG 730 of FIG. 7) of the first network through the second network.

According to various embodiments of the present disclosure, the processor may be configured to control the wireless communication circuit to transmit a tunneling message for establishing a security tunnel with the ePDG of the first network to the ePDG of the first network through the second network by using connection information for connecting to the ePDG of the first network.

According to various embodiments of the present disclosure, the tunneling message may include second connection information for receiving the radio signal for executing, by the electronic device, the call, the radio signal being provided from the first network, and third connection information for transmitting the radio signal for executing the call to the first network.

According to various embodiments of the present disclosure, the security tunnel may include a security tunnel at least partially based on IKEv2 or a security tunnel at least partially based on L2TP/IPsec.

According to various embodiments of the present disclosure, the first network may include at least one of VoLTE, ViLTE, VoWiFi, or ViWiFi.

According to various embodiments of the present disclosure, at least one SIM in addition to the first SIM and the second SIM may be further embedded in the processor, or at least one SIM in addition to the first SIM and the second SIM may be further connected to the processor to operate with the processor.

According to various embodiments of the present disclosure, a computer-readable recording medium has stored therein instructions configured to perform at least one operation by a processor, in which the at least one operation includes receiving a radio signal for executing, by an electronic device, a call with an external electronic device, through a first network, identifying a state of the radio signal received through the first network, transmitting an authentication request for executing the call to a second network connected with the electronic device, at least partially based on a result of the identification with respect to the state of the radio signal, and receiving the radio signal, transmitted from the first network, for executing the call with the external electronic device through the second network, at least partially based on a result with respect to the authentication request.

According to various embodiments of the present disclosure, an electronic device includes a processor, a wireless communication circuit operatively connected with the processor, and a first SIM and a second SIM that are mounted in the electronic device, in which the processor is configured to identify a state of a radio signal transmitted from a first network that is at least partially based on the first SIM, the radio signal being received through the wireless communication circuit, when the electronic device executes a call with an external electronic device by being connected with the first network, to control the wireless communication circuit to transmit a tunneling message for establishing a security tunnel with an ePDG of the first network to a second network connected with the electronic device, when determining at least partially based on a result of the identification that the electronic device enters a weak electric field environment of the first network, the tunneling message including an authentication request message for executing the call, to receive through the second network, a response with respect to the tunneling message transmitted to the first network through the second network, to transmit connection information, provided from the first network for the electronic device to execute the call with the external electronic device, to the first network by using the second network, and to control the wireless communication circuit to receive the radio signal, transmitted from the first network, for executing the call with the external electronic device through the second network.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:
1. An electronic device comprising:
a processor;

a wireless communication circuit operatively connected with the processor; and a first subscriber identification module (SIM) and a second SIM that are mounted in the electronic device, wherein the processor is configured to:

identify a state of a radio signal transmitted from a first network that is at least partially based on the first SIM, the radio signal being received through the wireless communication circuit, when the electronic device executes a call with an external electronic device by being connected with the first network, control the wireless communication circuit to transmit a tunneling message for establishing a security tunnel with an enhanced packet data gateway (ePDG) of the first network to a second network connected with the electronic device, when determining at least partially based on a result of the identification that the electronic device enters a weak electric field environment of the first network, the tunneling message comprising an authentication request message for executing the call, receive through the second network, a response with respect to the tunneling message transmitted to the first network through the second network, transmit connection information, provided from the first network for the electronic device to execute the call with the external electronic device, to the first network by using the second network, and control the wireless communication circuit to receive the radio signal, transmitted from the first network, for executing the call with the external electronic device through the second network.

2. The electronic device of claim 1, wherein the first network is at least partially based on the first SIM and the second network is at least partially based on the second SIM, and wherein the first SIM and the second SIM are embedded in the processor or are mounted in the electronic device to operate with the processor.

3. The electronic device of claim 1, wherein the first network comprises at least one of Voice over Long Term Evolution (VoLTE), Video over LTE (ViLTE), Voice over Wireless Fidelity (VoWiFi), or Video over WiFi (ViWiFi).

4. The electronic device of claim 1, wherein at least one subscriber identification module (SIM) in addition to a first SIM and a second SIM is further embedded in the processor, or at least one SIM in addition to the first SIM and the second SIM is further connected to the processor to operate with the processor.

5. The electronic device of claim 1, wherein the security tunnel is based on IKEv2 or based on L2TP/IPSec.

6. A method for controlling an electronic device, comprising:

identifying a state of a radio signal transmitted from a first network that is at least partially based on a first subscriber identification module (SIM) mounted in the electronic device, the radio signal being received through a wireless communication circuit, when the electronic device executes a call with an external electronic device by being connected with the first network, controlling a wireless communication circuit of the electronic device to transmit a tunneling message for establishing a security tunnel with an enhanced packet data gateway (ePDG) of the first network to a second network connected with the electronic device, when determining at least partially based on a result of the identification that the electronic device enters a weak electric field environment of the first network, the tunneling message comprising an authentication request message for executing the call, receiving through the second network, a response with respect to the tunneling message transmitted to the first network through the second network, transmitting connection information, provided from the first network for the electronic device to execute the call with the external electronic device, to the first network by using the second network, and controlling the wireless communication circuit to receive the radio signal, transmitted from the first network, for executing the call with the external electronic device through the second network.

7. The method of claim 6, wherein the first network is at least partially based on the first SIM and the second network is at least partially based on a second SIM, and wherein the first SIM and the second SIM are embedded in a processor or are mounted in the electronic device to operate with the processor.

8. The method of claim 6, wherein the first network comprises at least one of Voice over Long Term Evolution (VoLTE), Video over LTE (ViLTE), Voice over Wireless Fidelity (VoWiFi), or Video over WiFi (ViWiFi).

9. The method of claim 6, wherein at least one subscriber identification module (SIM) in addition to a first SIM and a second SIM is further embedded in a processor, or at least one SIM in addition to the first SIM and the second SIM is further connected to the processor to operate with the processor.

10. The method of claim 6, wherein the security tunnel is based on IKEv2 or based on L2TP/IPSec.

* * * * *